United States Patent Office 3,211,726
Patented Oct. 12, 1965

3,211,726
**PROCESS FOR THE PRODUCTION OF
6β:19-OXIDO-STEROIDS**
Albert Wettstein, Riehen, and Georg Anner, Karl Heusler, and Jaroslav Kalvoda, Basel, Hellmut Ueberwasser, Riehen, and Jules Heer, Binningen, Switzerland, assignors to Ciba Corporation, New York, N.Y., a corporation of Delaware
No Drawing. Filed Sept. 7, 1962, Ser. No. 222,168
Claims priority, application Switzerland, July 15, 1960, 8,133/60; Oct. 28, 1960, 12,107/60; Dec. 23, 1960, 14,393/60; Apr. 5, 1961, 3,989/61; June 2, 1961, 6,479/61; June 13, 1961, 6,895/61; Sept. 18, 1961, 10,803/61; Sept. 22, 1961, 11,071/61; Sept. 29, 1961, 11,331/61; Jan. 9, 1962, 185/62
10 Claims. (Cl. 260—239.55)

This application is a continuation in part of our co-pending application Ser. No. 122,657, filed July 10, 1961, by Albert Wettstein et al., and now abandoned.

The present invention relates to a new process for the preperation of 6β:19-oxido-steroids from 19-unsubstituted 6β-hydroxy-steroids.

The process of this invention is an important step in a novel and simple conversion of normal steroids into 19-nor-steroids. Since a number of 19-nor-steroids, more especially derivatives of 19-nor-testosterone and of 19-nor-progesterone, are used extensively as anabolic, androgenic, gestagenic and progestational agents a new process for the production of these compounds is of great importance. So far the 19-nor-steroids were available only by a complicated sequence of reactions which involve pyrolytic aromatization of the ring A and subsequent reduction with an alkali metal and ammonia. An alternative synthesis uses a micro-biological hydroxylation of the 19-carbon-atom followed by elimination of the angular C-19-substituent. The yield in the hydroxylation step however is in most cases unsatisfactory. In both known processes the possibilities for variations in substituents in ring B, C and D are very restricted due to the drastic conditions in the pyrolysis step on one hand and to the substrate-specificity of the enzymatic reaction on the other hand.

The new process however gives not only high yields of the desired end products but can be applied to a wide variety of different steroids since oxo groups, ketalized oxo groups, esterified and etherified hydroxy groups, halogen substituents or double bonds do not interfere in the reactions claimed.

The new process of the present invention consists in treating a 19-unsubstituted 6β-hydroxy-steroid with compounds generating monovalent positive iodine under such conditions as will bring about a homolytic cleavage of any 6-hypoiodites formed.

The 6β-hydroxy-steroids used as starting materials are reacted according to the process of the invention with monovalent, positive iodine, particularly a compound containing positive iodine. Such compounds are, for example N-iodo-carboxylic acid amides and imides, for example N-iodo-acetamide, N-iodo-succinimide or 1:3-diiodo-5:5-dimethylhydantoin. The use of hypoiodous acid and its derivatives, for example alkylhypoiodites, such as tertiary butylhypoiodite, is particularly advantageous. Alkylhypoiodites may be prepared, for example from heavy metal oxides, such as mercuric oxide, silver oxide, lead oxide and the like, with iodine and alcohols. Especially good yields of 6β:19-oxido-steroids are obtained when acylhypoiodites are used which may be advantageously obtained from heavy metal acylates, for example acetates, propionates, trifluoracetates, benzoates of the metals of the first and second sub-groups of the Periodic Table, for example from silver and mercuric acylates with iodine. A favorable method of preparing the acylhypoiodites consists in reacting iodine with a lead tetraacylate; lead diacylates and acylhypoiodites being formed. Monovalent, positive iodine is also contained in the compounds of iodine with other halogens, i.e. iodine chloride or iodine bromide. It is often an advantage to prepare the positive iodine used, particularly from the acylhypoiodites, in the manner described above directly in the reaction solution itself. In the case of starting materials which contain double bonds, the use of iodine compounds is particularly favorable, since iodine does not additively combine with the double bonds.

Surprisingly it was found, that also 5α-halogeno-6β-hydroxy-steroids, which are readily accessible from Δ⁵-steroids, can be used as starting material in the process of the present invention, although it was known that such halohydrines are easily dehydrohalogenated to form 5β:6β-oxido-steroids, by the action of metal salts of weak acids, such as alkali metal acetates.

The process of the present invention can be carried out, for example, in the following manner: The starting material is dissolved or suspended in a solvent that is inert towards oxidizing agents, for example in a hydrocarbon e.g. hexane or benzene, preferably an alicyclic hydrocarbon, such as cyclohexane, methylcyclohexane or dimethylcyclohexane or a halogenated hydrocarbon, preferably a polyhalogen-lower alkane or alkene, such as carbon tetrachloride or hexachloro-butadiene, or mixtures of two or more of said solvents. Hereupon, a lead tetraacylate, such as lead tetraacetate, iodine and a weak base, for example calcium carbonate, are added, and the reaction mixture is then stirred with heating under atmospheric or superatmospheric pressure. Alternatively, the reaction may be carried out in an analogous manner with the use of iodine and a silver acylate, or iodine and a mercury acylate (for example the acetate) or with a complex formed from these reagents. The time taken by the reaction depends on the temperature and/or on the solvent used. When the reaction is performed with lead tetraacetate in boiling cyclohexane, it is in general complete after about ½ to 3 hours.

Non-polar solvents favor homolytic cleavage of the hypoiodites as compared with heterolytic cleavage which would lead to 6-oxo-steroids. When hypoiodous acid or its derivatives, particularly acylhypoiodites, are used as reagents, they are preferably used in great excess, since these too undergo homolytic cleavage into carbon dioxide and alkyl halide. From the acetylhypoiodite formed in the reaction of lead tetraacetate with iodine there is easily formed, for example methyl iodide and carbon dioxide.

For the reaction according to the present invention it is of advantage to work at a raised temperature, for example between 50 and 150° C. The reaction is also accelerated by irradiating the reaction solution with visible and/or ultraviolet light, i.e. light of the wave length between 500 and 7,000 A. It is often of advantage to add excess, free iodine, to the irradiated reaction solution. When the 6-hypoiodite formed passes over into the 6β:19-oxido compound, hydroiodic acid is liberated, of which the free iodine is recovered by the action of a heavy metal acylate, having an oxidizing action. Therefore it is possible to add a small quantity of iodine only, when the operation is carried out in the presence of a heavy metal acylate, having an oxidizing action.

Usually 19-unsubstituted 6β:19-oxido-steroids are the only products formed in the process of the present invention. Depending on the reaction conditions and the starting materials, there can, however, be obtained as by-products, 6β:19-oxido-19-hydroxy-steroids, which are the cyclohemiacetals of 6β-hydroxy-19-oxo-steroids. These compounds preferably can be obtained, when the system generating monovalent position iodine is formed by a lead tetraacylate and iodine and the starting material contains in the 11-position an oxo group or a free or esterified α-hydroxyl group. Small amounts of 19:6β-lactones may also be formed in some cases.

If desired, the oxygenated 19-methyl group in a 6β:19-oxido-steroid obtained by the present process can be further oxidized, for example by treating the 6β:19-oxido-steroid with a strong oxidant, for example ruthenium tetroxide or preferably with a derivative of hexavalent chromium, such as chromic acid or tertiary butyl chromate, in a solvent such, for example, as a lower fatty acid such as acetic or propionic acid, or in a chlorinated hydrocarbon such as carbon tetrachloride, more especially at an elevated temperature ranging from 50 to 100° C. In this manner, by introducing an oxo group in position 19, there are obtained lactones of 6β-hydroxy-steroid-19-oic acids. These lactones are also accessible by oxidation of the 19-hydroxy-6β:19-oxido-compounds mentioned above.

On the other hand, any acyloxy groups present in the 6β:19-oxido-steroids obtained by the process of the invention, for example in positions 3, 11, 17 and/or 20, may be hydrolyzed and the resulting hydroxy compounds oxidized to form the corresponding ketones. In the 3-ketones a 4:5-double bond can be introduced by bromination and dehydrobromination performed in known manner. The $\Delta^4$-3-oxo grouping is particularly easy to prepare from a 5α-hydroxy-3-ketone or a 5α-halogeno-3-ketone by treatment with an alkali or with an acid. For the splitting off of hydrogen halide from the 3-oxo-5α-halogeno-6β:19-oxido-steroids even mild treatment with an alkali metal acetate or with pyridine suffices.

It is also possible, for example, to react one of the 5α - halogeno - 6β:19 - oxido - 17 - oxo - androstanes obtained according to the process of the invention with an alkyl-metal, alkenyl-metal or alkinyl-metal compound, for example with methyl magnesium iodide, methyl lithium, ethyl magnesium iodide, isobutyl lithium, allyl magnesium bromide, methallyl magnesium bromide, sodium-, potassium- or lithium-acetylide, propargyl magnesium bromide or lithium 2-methyl-acetylide; in this manner there are obtained (without the 5α-halogeno group being affected) the corresponding 17β - hydroxy - 17α - alkyl-, -alkenyl- or -alkinyl-androstanes. Following upon the reaction with the aforementioned organo - metal compounds a $\Delta^4$-3-oxo grouping may be formed in the manner described above.

The resulting $\Delta^4$-3:17-dioxo-6β:19-oxido-androstenes can be converted in known manner into $\Delta^4$-3-oxo-17β-hydroxy-6β:19-oxido-androstenes, for example by selective reduction with a complex metal hydride, such as sodium borohydride, or by reducing both oxo groups, for example with lithium aluminium hydride, to form the 3:17-diol and reoxidation in position 3 with manganese dioxide or with acetone and aluminum isopropylate or tertiary butylate at room temperature. The resulting 6β:19-oxido-testosterones can then be esterified in known manner.

It is also possible to introduce a 17α- and/or 21-hydroxyl group in known manner in a resulting 6β:19-oxido-20-oxo-pregnane, more especially, for example, by enolacetylation to the $\Delta^{17(20)}$-20-acetate, oxidation with a peracid and hydrolysis to form the 17α-hydroxy-20-ketone. The $\Delta^4$-3-oxo-grouping can then be formed as described above, before or after introducing a 21-hydroxyl group, for example by bromination, exchange with potassium acetate and hydrolysis.

The side chain of 3β-acetoxy-5α-halogeno-6β:19-oxido-spirostanes can be degraded in known manner, for example by heating with an acid anhydride and subsequent oxidation of the resulting furostene (pseudo-sapogenin), whereby the $\Delta^{16}$-3β-acetoxy-5α-halogeno-6β:19-oxido-20-oxo-pregnenes are obtained.

The 6β-hydroxy-steroids used as starting materials in the process claimed may belong to the androstane, pregnane, cholane, cholestane, spirostane, stigmastane and cardanolide series. Their ring system may contain further substituents, more especially in one or several of the positions 1 to 5, 7 to 9, 11, 12, 14 to 17 and 19 to 21, such as functionally converted hydroxyl or free or functionally converted oxo groups, hydrocarbon radicals, which latter may also be attached in the 6α-position, and/or halogen atoms. The term "functionally converted hydroxy and oxo groups" designates esterified or etherified hydroxy groups or ketalized oxo groups. Compounds containing oxo groups may also be converted into enol derivatives, such as enol ethers or enol esters. Furthermore the new compounds may contain double bonds or oxido groups, for example in positions 4:5, 9:11 or 16:17.

Especially important starting materials are 6β-hydroxy-androstanes, -pregnanes and -spirostanes, which contain in positions 3 and 5 substitutents which, subsequent to the formation of the 6β:19-oxido bridge, allow the introduction of a $\Delta^4$-3-oxo grouping, i.e. 3-oxygenated compounds which preferably contain in 5α-position an esterified or etherified hydroxyl group or more advantageously a halogen atom. These starting materials may be further oxygenated for example in the 11, 17, 20 and 21 positions and/or substituted in 6α and/or 16-position by a lower alkyl group and/or in 17α-position by a lower alkyl, alkenyl or alkinyl group.

The acyloxy radicals mentioned above, representing esterified hydroxyl groups, are more especially those of aliphatic, cycloaliphatic, cycloaliphatic-aliphatic, araliphatic, aromatic or heterocyclic carboxylic acids containing at most 15 carbon atoms, such as for example formic, acetic, propionic, butyric, valeric, trimethylacetic, caproic, oenanthic, decanoic, trifluoracetic, carbonic-monomethyl- or ethylester, hexahydrobenzoic, cyclopentyl-propionic, phenyl-propionic, benzoic or furoic acid. The halogen atoms mentioned are fluorine, chlorine or bromine, in the 5α-position especially chlorine or bromine, and the lower alkyl, alkenyl or alkinyl radicals are such as contain at most 7 carbon atoms, for example methyl, ethyl, n- or i-propyl, -butyl, -pentyl, -hexyl or -heptyl, vinyl, allyl, methallyl, ethinyl, 2-methyl-ethinyl, 2-chloro-ethinyl and 2-trifluoromethyl-ethinyl.

Ketalized oxo groups are for example lower alkylenedioxy groups, such as ethylenedioxy or propylenedioxy groups and etherified hydroxy groups are for example lower alkoxy groups, such as methoxy, ethoxy or propoxy groups or the tetrahydro-pyranyloxy group.

These starting materials are prepared in known manner: The 5α-halogen-6β-hydroxy compounds for example by the addition of hypochlorous or hypobromous acid to a 5,6-unsaturated steroid, 6β-hydroxy-5α-steroids by catalytic reduction of the corresponding 6-ketones which in turn are prepared from the 5,6-unsaturated compounds by nitration and zinc reduction. 6α-alkyl e.g. 6α-methyl-6β-hydroxy-steroids are obtained by the reaction of metalalkyl compounds such as methyl-magnesium iodide or methyl lithium with a 6-ketone.

For the production of the 19-nor-steroids the 6β:19-oxido-steroids of the present invention are converted into $\Delta^4$-3-oxo-19-hydroxy-steroids, from which the angular substituent is eliminated in known manner, preferably after oxidation to an aldehyde or acid function. The transformation of the 5α-halogen-6β:19-oxido-steroids or of the $\Delta^4$-3-oxo-6β:19-oxido-steroids into $\Delta^5$ - 19 - hydroxy- and $\Delta^4$-3-oxo-19-hydroxy-steroids respectively is effected under the influence of a reducing agent, for example with zinc and acetic acid. These processes are described in our copending applications Ser. No. 122,655, filed July 10, 1961, now U.S. Patent No. 3,067,198, by Albert Wettstein et al., and Ser. No. 122,656, filed July 10, 1961, now U.S. Patent No. 3,077,482, by Albert Wettstein et al.

6β:19-oxido-steroids with a hydrogen atom in 5α-position can be transformed into $\Delta^5$-19-hydroxy-steroids by acylolytic opening of the oxide bridge, for example with acetic anhydride and p-toluene sulfonic acid or boron trifluoride. Any 6-acyloxy-steroid formed in this reaction can then be hydrolyzed to a 6-hydroxy steroid from which water is eliminated in known manner. $\Delta^5$-3,19-dihydroxy-steroids are converted into $\Delta^4$-3-oxo-19-nor-steroids by oxidation under the Oppenauer conditions, i.e. with aluminum-isopropoxide and cyclohexanone in boiling toluene.

Another object of the present inventions are saturated and unsaturated 6β:19-oxido-spirostanes, especially $\Delta^4$-3-oxo- and the 3β-hydroxy-5α-halogeno-6β:19-oxido-derivatives and their esters as well as the 19:6β-lactones of the 3β - hydroxy - 5α - halogeno - 6β - hydroxy - 19 - acids of the spirostane series.

The present invention also relates to 11-oxigenated 6β:19-oxido-allorpregnanes of the formula

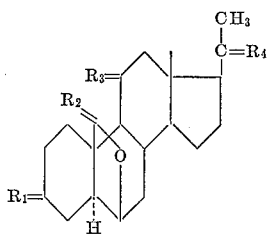

in which $R_1$, $R_3$ and $R_4$ stand for oxo or hydrogen together with hydroxy or acyloxy and $R_2$ stands for hydrogen, oxo or hydrogen together with hydroxy or acyloxy.

By oxidation of the 19-unsubstituted 11-oxygenated-6β:19-oxides with chromium trioxide in acetic acid at 80° the corresponding 19:6β-lactones of the 6β-hydroxy-19-oic acids are obtained. Then a 3β-acetoxy group present is hydrolyzed with dilute hydrochloric acid and oxidized to a 3-oxo-group in known manner. By treatment with a quinone, especially with 2,3-dicyano-5,6-dichloro-benzoquinone in boiling toluene the corresponding $\Delta^{1,4}$-3-oxo-compounds are obtained which under the dehydration conditions or by subsequent treatment with hydrochloric acid in tertiary butanol are converted into 11 - oxygenated $\Delta^{1,3,5(10),6}$ - 3 - hydroxy - 19 - nor - pregnatetraenes. These compounds are etherified in 3-position and then reduced, first catalytically with a palladium catalyst to hydrogenate the 6,7-double bond, then with lithium in liquid ammonia to 11-oxygenated $\Delta^{2,5(10)}$-3-methoxy-pregnadienes. These compounds, when treated with hydrochloric acid in tertiary butanol at 75° for 3 hours are transformed into $\Delta^{4,9(10)}$-3-oxo-19-nor-pregnadienes. Oxidation of a 20-hydroxy group then produces the $\Delta^{4,9(10)}$-3,20-dioxo-19-nor-pregnadiene, a powerful gestagenic agent.

The present invention also relates to compounds of the formula

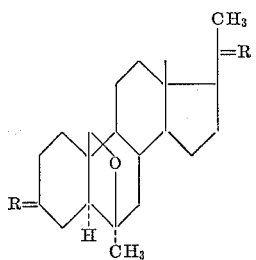

wherein R stands for oxo, hydrogen together with hydroxy and hydrogen together with acetoxy. By treatment of the 3,20-dioxo-6β:19-oxido-6α-methyl-pregnane which is obtained by hydrolysis and oxidation from the 3,20-diacyloxy compound, with acetic anhydride and p-toluenesulfonic acid for 18 hours at room temperature followed by acid hydrolysis the 19-acetoxy-6α-methyl-progesterone is formed. Hydrolysis of the ester grouping with potassium carbonate in dilute methanol affords the 19-hydroxy compound, oxidation with chromium trioxide gives the 19-oic acid which after decarboxylation produces the 6α-methyl-19-nor-progesterone, a highly active progestational agent.

The following examples illustrate the invention. The temperatures are given in centigrades.

*Example 1*

(a) A suspension of 20.0 grams of calcium carbonate and 60.0 pre-dried lead tetraacetate in 2 liters of cyclohexane is heated for a short time at 80° C., then treated with 16.0 grams of iodine, and the reaction mixture is stirred for 30 minutes under reflux in the dark, then treated with 10.0 grams of 3β-acetoxy-5α-chloro-6β-hydroxy-cholestane and refluxed for 3 hours longer, this time in daylight. The slightly pinkish solution is then cooled, freed by filtration from inorganic salts, the residue is exhaustively washed with absolute ether, and the filtrates are combined and washed in a separating funnel with sodium thiosulfate solution of 10% strength and with water. The solution is dried with sodium sulfate and evaporated under reduced pressure, to yield 11.20 grams of a crystalline product. After recrystallization from ether+methanol there are obtained 8.95 grams of 3β-acetoxy-5α-chloro-6β:19-oxido-cholestane melting at 139–140° C. The analytically pure compound melts at 141–142° C. Optical rotation $[\alpha]_D = +7.8° \pm 1.0°$ (c.=1.156 in $CHCl_3$).

The infra-red spectrum of the compound contains absorption bands inter alia at 5.78, 6.71, 8.06, 9.05, 9.60, 10.55, 10,78, 11.65 and 12.50μ.

In the molecular magnetic resonance spectrum (in carbon tetrachloride, referred to benzene) the band of the C-19 methyl group at 314 cycles is absent, but at 156–164 cycles a complex band appears which may be attributed to the C-19 or C-6-$CH_2$—O or CH—O protone respectively.

4.00 grams of 3β - acetoxy - 5α - chloro-6β:19-oxido-cholestane are dissolved with heating in 500 cc. of methanol and treated with a warm solution of 4.00 grams of potassium carbonate in 25 cc. of water. The reaction solution is refluxed for 1 hour, concentrated in vacuum after the addition of water to remove the methanol, and taken up in ether. The ethereal solution is washed twice with water, dried with sodium sulfate and evaporated, to give a quantitative yield of 3β-hydroxy-5α-chloro-6β:19-oxido-cholestane melting at 136–138° C. After one recrystallization from methanol the compound melts at 137–138° C. The infra-red absorption spectrum contains bands, inter alia, at 2.80, 6.73, 9.55, 10.03, 10.60, 10.87, 11.05 and 12.10μ.

In an analogous manner there are obtained from 5.0 grams of 3β-acetoxy-5α-chloro-6β-hydroxy-spirostane 4.4 grams of 3β - acetoxy - 5α - chloro-6β:19-oxido-spirostane which can be hydrolyzed to 3β-hydroxy-5α-chloro-6β:19-oxido-spirostane as described above.

To manufacture the starting material a solution of 5.00 grams of cholesterol acetate in 65 cc. of ether is treated with 8.0 grams of chlorinated lime and 300 cc. of water, 6.1 cc. of glacial acetic acid are added and the mixture is stirred for 30 minutes at 25° C. with the aid of a powerful vibrator. The mixture is diluted with ether and the organic phase is separated, washed with ice-cold dilute sodium bicarbonate solution and with water until it is neutral, dried and evaporated under vacuum, to yield 5.65 grams of a crystalline product. After having been recrystalized from ether+petroleum ether the latter yields 1.98 to 2.10 grams of 3β-acetoxy-5α-chloro-6β-hydroxy-cholestane melting at 192 to 194° C. The infra-red absorption spectrum of this compound displays bands, inter alia, at 2.75, 5.78, 7.26, 7.32, 8.05, 8.65, 9.70, 10.63 and 10.90μ.

In an identical manner there is obtained

From $\Delta^5$-3β-acetoxy-17-oxo-androstene the 3β-acetoxy-5α-chloro-6β-hydroxy-17-oxo-androstane melting at 225 to 227° C., From $\Delta^5$-3β:17β-diacetoxy-androstene the 3β:17β-diacetoxy-5α-chloro-6β-hydroxy-androstane melting at 197 to 199° C., From Δ⁵ - 3β-acetoxy-17β-hydroxy-17α-methyl-androstene the 3β-acetoxy-5α-chloro-6β:17β-dihydroxy-17α-methyl-androstane melting at 179 to 181°, From Δ⁵ - 3β:17β - diacetoxy-17α-methyl-androstene the -3β:17β - diacetoxy-5α-chloro-6β-hydroxy-17α-methyl-androstane, and From diosgenin acetate the -3β-acetoxy-5β-chloro-6β-hydroxy-spirostane.

For the oxidation with lead tetraacetate the solvent used may be benzene instead of cyclohexane.

(b) 3.60 grams of crude 3β-hydroxy-5α-chloro-6β:19-oxido-cholestane in 100 cc. of pyridine are mixed with 8.00 grams of chromium trioxide in 150 cc. of pyridine and the whole is stirred for 24 hours at 45° C. The cooled reaction mixture is treated with about 100 grams of ice, 100 cc. of a sodium hydrosulfite solution of 40% strength are slowly added with swirling and the mixture is kept for 15 minutes at 20° C. The green solution is then extracted with ether, the pyridine is removed by washing with dilute hydrochloric acid and water, the ether layer is washed with sodium bicarbonate solution and water until it is neutral and evaporated under vacuum, to yield 2.690 grams of crude Δ⁴-3-oxo-6β:19-oxido-cholestane. The compound does not crystallise; it is purified by chromatography on alumina. Its infra-red absorption spectrum contains bands, inter alia, at 6.00, 6.85, 7.25, 8.35, 8.80, 9.80, 10.40, 10.60 and 11.40μ. In the ultra-violet spectrum it displays an absorption maximum at 241 mμ.

An analogous reaction of 3β-hydroxy-5α-chloro-6β:19-oixido-spirostane gives a very good yield of Δ⁴-3-oxo-6β:19-oxido-spirostane.

*Example 2*

(a) A suspension of 22.0 grams of calcium carbonate and 66.0 grams of dried lead tetraacetate in 3.3 liters of cyclohexane is heated to 80° C., 17.6 grams of iodine are added, and the mixture is refluxed and stirred for 20 minutes in the dark. The slightly cooled reaction solution is treated with 11.0 grams of 3β-acetoxy-5α-chloro-6β-hydroxy-17-oxo-androstane and then refluxed with stirring for 2 hours in daylight. The cooled reaction mixture is filtered, the residue exhaustively washed with absolute ether and the filtrate is washed with sodium thiosulfate solution of 10% strength and with water. Evaporation of the dried solution under vacuum yields 12.1 grams of a crystalline product which, after recrystallization from ether+methanol, yields 7.65 grams of 3β-acetoxy-5α-chloro-6β:19-oxido-17-oxo-androstane melting at 180 to 182° C. The infra-red absorption spectrum of the pure compound contains bands, inter alia, at 5.76, 6.73, 7.35, 8.10, 9.65, 10.60, 10.82, 11.35, 11.67 and 12.50μ.

A solution of 2.0 grams of 3β-acetoxy-5α-chloro-6β:19-oxido-17-oxo-androstane in 200 cc. of methanol is mixed with a solution of 2.0 grams of potassium carbonate in 10 cc. of water and the whole is refluxed for one hour. The reaction mixture is treated with water and freed from methanol under vacuum, taken up in ether, washed three times with water, dried with sodium sulfate and evaporated. Yield: 1.620 grams of 3β-hydroxy-5α-chloro-6β:19-oxido-17-oxo-androstane melting at 223–226° C. After having been recrystallized from methylene chloride+methanol the pure compound melts at 227 to 229° C. and displays in the infra-red spectrum absorption bands, inter alia, at 2.80, 3.28, 5.78, 6.75, 9.55, 9.78, 10.05, 10.63, 10.87, 11.33, 11.70 and 12.55μ.

(b) An oxidation mixture of 3.00 grams of chromium trioxide and 60 cc. of pyridine is treated with 1.500 grams of 3β-hydroxy-5α-chloro-6β:19 - oxido-17-oxo-androstane. After 24 hours at 45 to 50° C. the reaction mixture is cooled, treated with 50 grams of ice and 50 cc. of sodium hydrosulfite solution of 40% strength, extracted with ether and worked up as described in Example 1, part (b). The resulting crude product is recrystallized once from methylene chloride+methanol and yields 825 mg. of Δ⁴-3:17-dioxo-6β:19-oxido-androstene melting at 184 to 186° C. The infra-red absorption spectrum of the product contains bands, inter alia, at 5.80, 6.01, 6.82, 6.95, 7.35, 7.65, 8.40, 8.81, 9.23, 9.80, 9.92, 10.40, 10.63, 11.40 and 12.30μ.

(c) 7.5 grams of 3β-acetoxy-6β:19-oxido-5α-chloro-17-oxo-androstane in 100 cc. of toluene are treated with a Grignard reagent prepared from 8 cc. of methyl iodide in 120 cc. of ether with the aid of excess magnesium. When heat is no longer being evolved, the mixture is heated while distilling off the solvent until the temperature of the remaining reaction mixture has risen to 90° C. The whole is then diluted with benzene and the reaction products are dissolved by adding aqueous ammonium chloride solution and dilute hydrochloric acid. The organic phase is washed with sodium thiosulfate solution, dried and evaporated, to yield 7 grams of crude 3β:17β-dihydroxy-5α-chloro-6β:19-oxido-17α-methyl - androstane which crystallizes on addition of a small amount of methylene chloride and is obtained from isopropanol in crystals which melt at 212 to 214° C. and contain 1 molecular equivalent of isopropanol of crystallization.

9 grams of this product are dissolved in acetone and treated with excess aqueous chromic acid in the presence of a small amount of sulfuric acid for 10 minutes at 10 to 15° C., diluted with much water, the crude 3-oxo-5α-chloro-6β:19-oxido-17α-methyl-17β-hydroxy - androstane is suctioned off and the moist filter residue is boiled in 1 liter of methanol with 25 grams of potassium acetate while distilling off methanol, the residue is taken up in benzene, the benzene solution is washed with water, dried and evaporated. There are obtained 6.9 grams of 6β:19-oxido-17α-methyl-testosterone which, after recrystallization from benzene, melts at 157 to 158° C.

When 3β-acetoxy-6β:19-oxido-5α-chloro-17-oxo-androstane is reacted in a similar manner with ethyl magnesium bromide, there is obtained 3β:17β-dihydroxy-5α-chloro-6β:19-oxido-17α-ethyl-androstane which, by oxidation and treatment with potassium acetate as described above, yields 6β:19-oxido-17α-ethyl-testosterone.

When in the above example methyl magnesium iodide is replaced by allyl magnesium bromide, there is obtained 3β:17β-dihydroxy-5α-chloro - 6β:19 - oxido-17-allyl-androstane which, in the form of the crude crystallizate, melts at 205 to 207° C. and displays in the infra-red absorption spectrum bands, inter alia, at 2.75, 6.12, 6.75, 6.9, 7.6, 9.5, 9.76, 10.0 and 10.85μ. When it is treated as described above with chromic acid, it yields 3-oxo-17β-hydroxy-5α-chloro-6β:19 - oxido - 17α - allyl - androstane (characteristic bands in the infra-red spectrum at 5.8, 6.1, 6.7, 7.5, 8.1, 9.1 and 9.7μ) which, on treatment with methanolic potassium acetate as described above, yields Δ⁴-3-oxo-6β:19-oxido-17α-allyl-17β - hydroxy - androstene melting at 90° C. Characteristic bands in the infra-red spectrum at 6.0, 6.1, 6.8, 7.26, 8.35, 8.75, 9.74, 10.63 and 11.36μ.

(d) A solution of 5 grams of 3β-acetoxy-5α-chloro-6β:19-oxido-17-oxo-androstane in 100 cc. of glacial acetic acid is treated at 85 to 90° C. within 30 minutes with a solution of 7.5 grams of chromium trioxide in 7.5 cc. of water and 60 cc. of glacial acetic acid. After another 15 minutes the reaction mixture is diluted with water and extracted with methylene chloride. The methylene chloride solution is washed with water and then with sodium bicarbonate solution, dried with sodium sulfate and evaporated, to yield 2.2 grams of the 19:6β-lactone of 3β-acetoxy-5α-chloro-6β-hydroxy-17-oxo - androstane-19-acid which is crystallized by adding ether and freed from any residual oxido compound by recrystallization from alcohol. The pure lactone melts at 198 to 199° C.

In an analogous manner 3β-acetoxy-5α-chloro-6β:19-oxido-spirostane yields on oxidation the lactone of 3β-acetoxy-5α-chloro-6β-hydroxy-spirostane-19-acid.

9

(e) A suspension of 16 grams of lithium aluminum hydride in 1.5 liters of tetrahydrofuran is treated in the course of 10 minutes with stirring with a solution of 40 grams of Δ⁴-3:17-dioxo-6β:19-oxido-androstene in 800 cc. of tetrahydrofuran. The mixture is then refluxed at the boil for 1½ hours, cooled to 10° C., and at 10 to 20° C. a mixture of 500 cc. of ethyl acetate and 1.5 liters of ether is run in. The mixture is then treated at 10 to 20° C. with a solution of 300 grams of anhydrous sodium sulfate in 900 cc. of water, the organic solution is decanted and the remaining sludge is twice stirred with methylene chloride. The methylene chloride extracts are washed with 500 cc. of 2 N-hydrochloric acid and combined with the tetrahydrofuran solution. The solution is dried, filtered, and then evaporated under reduced pressure at first at 60° C. and then at 40° C. bath temperature. There are obtained 40 grams of crystalline Δ⁴-3:17β-dihydroxy-6β:19-oxido-androstene which, after having been recrystallized from chloroform, melts at 227 to 229° C. The resulting crude reaction product (40 grams) is dissolved in a mixture of 300 cc. of acetone and 1.2 liters of benzene, treated with 80 grams of aluminum isopropylate and the whole is stirred for 17 hours under nitrogen at 30 to 31° C. The reaction mixture is cooled and 140 cc. of Seignette salt solution of 50% strength are rapidly added dropwise. The clear organic layer is decanted and the thickly liquid aqueous phase is stirred with 1 liter of benzene. The combined organic solutions are dried with sodium sulfate and evaporated under vacuum. The residue is dissolved in ether, filtered through a column of alumina (height 7 cm. diameter 4 cm.) and once more evaporated. The crude product (about 40 grams) yields on recrystallization from 60 cc. of acetone a first fraction of 24 grams of pure Δ⁴-3-oxo-6β:19-oxido-17β-hydroxy-androstene (6β:19-oxido-testosterone) in the form of crystals containing acetone melting at 78 to 80° C. After being heated in a high vacuum for a longer time the compound melts at 127–130° C.

(f) A solution of 12.2 grams of 6β:19-oxido-testosterone in 36 cc. of pyridine is treated at 10 to 15° C. while being stirred within 2 minutes with 8 cc. of caprylchloride. The reaction mixture is allowed to heat up within 30 minutes slowly to 20° C. while being stirred, ice and water are added, and the whole is extracted after 2 hours with benzene. The extracts are washed with 2 N-hydrochloric acid and ice-cold sodium bicarbonate solution of 5% strength, dried and evaporated in a water-jet vacuum, to yield 17.5 grams of Δ⁴-3-oxo-6β:19-oxido-17β-decanoyloxy-androstene (6β:19-oxido-testosterone caprinate) as a pale oil.

When 6β:19-oxido-testosterone is esterified in an analogous manner with β-phenylpropionyl chloride, Δ⁴-3-oxo - 6β:19 - oxido - 17β-(β - phenylpropionyloxy)-androstene is obtained as an almost colorless oil.

2.0 grams of 6β:19-oxido-testosterone are dissolved in a mixture of 10 cc. of pyridine and 10 cc. of acetic anhydride, heated for 3 hours at 60° C. and then evaporated in a water-jet vacuum. Crystallization of the residue from ether yields 1.82 grams of Δ⁴-3-oxo-6β:19-oxido-17β-acetoxy-androstene melting at 149 to 152° C. Optical rotation $[\alpha]_D = -96°$ (in chloroform). Ultra-violet maximum at 238 mμ (ε=13 200). Bands in the infra-red spectrum, inter alia, at 5.76, 5.96, 6.73, 7.27, 8.09, 9.10, 9.17, 9.26 and 11.42μ.

(g) A solution of 940 mg. of Δ⁴-3:17-dioxo-6β:19-oxido-androstene in 50 cc. of methanol is cooled to −20° C. and treated with a solution of 100 mg. of sodium borohydride in 2.5 cc. of 2 N-sodium hydroxide solution. The mixture is kept for 2 hours at −20° C., treated with 10 cc. of 2 N-sulfuric acid and 30 cc. of water, and the methanol is distilled off in a water-jet vacuum. The product which separates out is taken up in methylene chloride, and the organic solution is washed with water, dried and evaporated. The crystalline residue is stirred for one hour with 100 cc. of benzene and the insoluble Δ⁴- 3:17β - dihydroxy - 6β:19-oxido-androstene (360 mg.) is then filtered off. Recrystallization from methylene chloride+methanol yields the pure compound which melts at 221 to 222° C. Optical rotation $$[\alpha]_D = +48.6°$$

(in chloroform+alcohol 1:1). The benzene filtrate is evaporated to dryness and the residue (598 mg.) is crystallized from acetone, to yield 346 mg. of pure Δ⁴-3-oxo-6β:19-oxido-17β-hydroxy-androstene melting at 78 to 80° C.

*Example 3*

A mixture of 59.4 grams of lead tetraacetate, 27 grams of calcium carbonate and 2430 cc. of cyclohexane is heated for 30 minutes at the boil, then treated with 13.45 grams of crude 3β-acetoxy-5α-bromo-6β-hydroxy-17-oxo-androstane and 17.5 grams of iodine, and then further boiled and stirred while being irradiated with a 500-watt lamp. After one hour the solution is colorless; it is cooled, filtered, the filter residue is rinsed with cyclohexane and the filtrate is agitated with dilute sodium thiosulfate solution. The organic solution is then dried and evaporated in a water-jet vacuum. The oily residue (22.75 grams) is dissolved in a 1:4-mixture of benzene and hexane and filtered through 200 grams of alumina. At first a high-boiling oil is eluted, then 1:4- and 1:1-mixtures of benzene and hexane elute about 7.0 grams of substance. Crystallization of this fraction residue from methylene chloride+ether yields 5.5 grams of pure 3β-acetoxy - 5α-bromo-6β:19-oxido - 17-oxo-androstane of double melting point 174–178/184–187° C. Optical rotation $[\alpha]_D = +44.6°$ (in chloroform). The infra-red spectrum of the compound contains bands, inter alia, at 5.76, 6.68, 7.30, 8.09, 9.16 and 10.92μ.

From the following fraction eluted with benzene and with mixtures of benzene and ethyl acetate there is isolated by crystallization from methanol or from methylene chloride+ether a compound of the formula $C_{21}H_{30}O_4$ melting at 219 to 221° C. Optical rotation $[\alpha]_D = -8.7°$ (in chloroform). The infra-red spectrum of the compound contains bands, inter alia, at 5.96, 7.26, 7.31, 8.10, 9.73 and 11.52μ.

A mixture of 5.07 grams of 3β-acetoxy-5α-bromo-6β:19-oxido-17-oxo-androstane in 500 cc. methanol with a solution of 5.0 grams of potassium carbonate in 50 cc. of water is heated for one hour on a bath maintained at 80° C., then evaporated in a water-jet vacuum until crystallization sets in, taken up in methylene chloride and the organic solution is washed with water, dried and evaporated, to yield 4.52 grams of crude crystalline 3β-hydroxy - 5α-bromo - 6β:19-oxido - 17-oxo-androstane which melts at 214 to 218° C. after recrystallization from methylene chloride+ether (conversion above 188° C). Optical rotation $[\alpha]_D = +47.1°$ (in chloroform). The infra-red spectrum contains bands, inter alia, at 2.75, 5.75, 6.69, 9.52, 9.79, 10.06 and 11.05μ.

A solution of 700 mg. of 3β-hydroxy-5α-bromo-6β:19-oxido-17-oxo-androstane in 35 cc. of acetone is cooled to 0° C. and then treated with 1.0 cc. of a solution, diluted with water to 50.0 cc., of 13.3 grams of chromium trioxide in 11.5 cc. of concentrated sulfuric acid and the whole is stirred for 15 minutes at 0° C., then treated with a solution of 8.0 grams of crystalline sodium acetate in 15 cc. of water and diluted with benzene. The organic phase is separated and washed with water. The residue of the dried benzene solution yields on crystallization from methylene chloride+ether 570 mg. of the pure Δ⁴-3:17-dioxo-6β:19-oxido-androstene melting at 184 to 186° C. described in Example 2, part (b).

*Example 4*

10.0 grams of mercuric diacetate and 3.0 grams of calcium carbonate are suspended in 200 cc. of cyclohexane. After adding 2.5 grams of 3β-acetoxy-5α-chloro- 6β-hydroxy-17-oxo-androstane and 11.0 grams of iodine, the reaction mixture is heated to the boil for 1 hour while being stirred and irradiated with a 500-watt lamp. A large quantity of red mercuric iodide separates. The reaction mass is cooled, the precipitate separated by filtration and washed with cyclohexane. The filtrate is washed with potassium iodide solution of 5% strength, decolorized with sodium thiosulfate, washed with water, dried and evaporated. There are obtained 2.97 grams of crystalline crude product which is recrystallized from a mixture of ether and hexane to yield 1.70 grams of pure 3β-acetoxy - 5α-chloro - 6β:19-oxido - 17-oxo-androstane melting at 180–182° C.

*Example 5*

4.5 grams of iodine are added to a suspension of 5.0 grams of silver acetate and 2.5 grams of 3β-acetoxy-5α-chloro-6β-hydroxy-17-oxo-androstane in 200 cc. of cyclohexane, and the reaction mixture heated to the boil while being stirred and irradiated. After two hours, the mixture is cooled, filtered, the residue is washed with cyclohexane and the filtrate decolored by extraction with dilute thiosulfate solution and water. By evaporating the cyclohexane solution there are obtained 2.82 grams of crystalline residue which in addition to a small amount of oily by-products consists mainly of 3β-acetoxy-5α-chloro-6β:19-oxido-17-oxo-androstane. By crystallization from a mixture of ether and hexane there are obtained 1.95 grams of the pure compound melting at 180–182° C.

*Example 6*

2.5 grams of 3β-acetoxy-5α-chloro-6β-hydroxy-17-oxo-androstane, 3.0 grams of calcium carbonate, 5.0 grams of N-iodosuccinimide and 2.85 grams of iodine are suspended in 200 cc. of cyclohexane and the mixture heated to the boil for 3 hours while being stirred and irradiated. After 1½ hours, a further 5.0 grams of N-iodosuccinimide are added. At the end of the reaction time, the mixture is cooled, the precipitate filtered off and washed with cyclohexane. The filtrate is washed with potassium iodide solution, sodium thiosulfate solution and water, dried and evaporated under a water-jet vacuum. There are obtained 824 mg. of 3β-acetoxy-5α-chloro-6β:19-oxido-17-oxo-androstane. The filter residue is extracted with 250 cc. of methylene chloride and the extract washed in the same manner as the cyclohexane solution mentioned above, dried and evaporated. The residue (1.812 grams) yields on crystallization from ether 1.45 grams of pure starting material melting at 225–227° C.

*Example 7*

2.5 grams of 3β-acetoxy-5α-chloro-6β-hydroxy-17-oxo-androstane are suspended in 200 cc. of cyclohexane. 3.0 grams of calcium carbonate, 4.0 grams of N-bromosuccinimide and 2.85 grams of iodine are added, and the whole is boiled under reflux for two hours while being stirred and irradiated. The reaction mixture is worked up as described in Example 6. There are obtained 3.128 grams of an oil which crystallizes on the addition of ether and hexane. For the purpose of purification a benzene solution of the crude product is filtered through 25 grams of aluminum oxide and washed well with benzene (a total of 400 cc.). A residue (2.74 grams) is obtained which consists mainly of 3β-acetoxy-5α-chloro-6β:19-oxido-17-oxo-androstane. The pure product, melting at 180–182° C., is isolated by crystallization from a mixture of ether and hexane.

*Example 8*

(a) A mixture of 150 cc. of cyclohexane, 1.0 gram of calcium carbonate, 3.0 grams of lead tetraacetate and 980 mg. of iodine is heated for ½ hour with stirring at 80° C. in the dark. 500 mg. of 3β:17β-diacetoxy-5α-chloro-6β-hydroxy-androstane are added and the reaction mixture is refluxed further (1½ to 2½ hours) until it has lost its color. The cooled solution is filtered, the residue is washed with ether, and the filtrate is washed with sodium thiosulfate solution of 10% strength and water, dried and evaporated under reduced pressure. Yield: 620 mg. of amorphous 3β:17β - diacetoxy-5α-chloro-6β:19-oxido-androstane mixed with a small amount of a sparingly volatile oil of aromatic odour; the product is purified on alumina. After crystallization from alcohol the pure compound melts at 160 to 161° C. Its infra-red spectrum contains, in addition to the strong acetate absorptions at 5.76, 8.16 and 9.65µ, absorption bands at 6.72, 10.60, 10.75 and 12.51µ.

A solution of 870 mg. of crude 3β:17β-diacetoxy-5α-chloro-6β:19-oxido-androstane in 50 cc. of methanol is treated with 250 mg. of sodium hydroxide in 1 cc. of water; the mixture is kept for 3 days at 25° C., treated with water, and the methanol is evaporated under vacuum. The residue is taken up in ether+methylene chloride, washed with water until it is neutral and the product isolated in the usual manner, to yield 680 mg. of crystalline 3β:17β-dihydroxy-5α-chloro-6β:19-oxido-androstane. After one recrystallization the compound melts at 220 to 224° C. The infra-red absorption spectrum contains bands, inter alia, at 2.76, 6.75, 7.00, 7.30, 9.55, 9.76, 10.62, 10.90, 11.70 and 12.60µ.

(b) A solution of 80 mg. of 3β:17β-dihydroxy-5α-chloro-6β:19-oxido-androstane in 5 cc. of pyridine is treated with a mixture of 200 mg. of chromium trioxide and 5 cc. of pyridine and heated with stirring for 20 hours at 45 to 50° C. Working up as described in Example 1, part (b), followed by recrystallization from methylene chloride+methanol, yields 45 mg. of Δ⁴-3:17-dioxo-6β:19-oxido-androstene melting at 184 to 186° C., which is in every respect identical with the product described in Example 2, part (b).

(c) When 1 gram of the 3β:17β-diacetoxy-5α-chloro-6β:19-oxido-androstane described in part (a) is dissolved in 25 cc. of glacial acetic acid and treated with 1.5 grams of chromium trioxide at 85 to 90° C. as described in Example 2, part (d) there is obtained 0.88 gram of the lactone of 3β:17β - diacetoxy-5α-chloro-6β-hydroxy-androstane-19-acid melting at 185 to 186° C.

*Example 9*

A mixture of 22 grams of lead tetraacetate, 10 grams of calcium carbonate and 900 cc. of cyclohexane is heated with stirring for 30 minutes at the boil. 5.0 grams of 3β:17β-diacetoxy-5α-bromo-6β-hydroxy-androstane and 6.4 grams of iodine are then added and the whole is stirred for another hour at the boil while being irradiated with a 500-watt lamp, then cooled, the colorless solution is filtered and the filtrate is washed with water, dried and evaporated in a water-jet vacuum. There are obtained 5.53 grams of a crude product which is dissolved in a 1:4-mixture of benzene and hexane and filtered through 100 grams of alumina. Elution with a 1:4-mixture and a 1:1-mixture of benzene and hexane and with plain benzene elutes 3.4 grams of substance which after crystallization from methylene chloride+ether+hexane yields 2.6 grams of pure 3β:17β-diacetoxy-5α-bromo-6β:19-oxido-androstane melting at 178 to 180° C. Optical rotation [α]_D=−5.4° C. (in chloroform). In the infra-red spectrum of the compound there are bands, inter alia, at 5.78, 6.69, 7.30, 8.10, 9.12, 9.63, 9.75 and 10.93µ.

A mixture of 2.236 grams of the latter compound, 225 cc. of methanol and a solution of 2.25 grams of potassium carbonate in 22.5 ml. of water is refluxed for one hour. The reaction mixture is then cooled and concentrated in a water-jet vacuum until crystallization sets in. The concentrate is taken up in a 3:1-mixture of methylene chloride and methanol and washed with water. The organic solution is dried and evaporated, to yield 1.83 grams of pure 3β:17β-dihydroxy-5α-bromo-6β:19-oxido-androstane melting at 235 to 236° C. Optical rotation [α]_D=−8.7° (in chloroform). Infra-red bands (in Nujol), inter alia, at 2.93, 6.70, 7.72, 8.61, 9.03, 9.38, 11.08, 11.76 and 12.69μ.

A solution of 500 mg. of crude 3β:17β-dihydroxy-5α-bromo-6β:19-oxido-androstane in 50 cc. of acetone is cooled to 0° C. and treated with 1.0 cc. of a solution, diluted with water to 50 cc., of 13.3 grams of chromium trioxide in 11.5 cc. of concentrated sulfuric acid. The mixture is stirred for 25 minutes at 0° C., treated with 8.0 grams of crystalline sodium acetate and 15 cc. of water, and diluted with benzene. The organic phase is washed with water and the benzene solution is dried and evaporated to dryness in a water-jet vacuum. The residue (409 mg.) is crystallized from methylene chloride+ether, to yield 339 mg. of pure Δ⁴-3:17-dioxo-6β:19-oxido-androstene melting at 184 to 186° C.

Example 10

(a) A suspension of 10 grams of calcium carbonate and 30 grams of lead tetraacetate in 1 liter of cyclohexane is heated to 80° C., treated with 8.0 grams of iodine and then with 5 grams of 3β:20β-diacetoxy-5α-chloro-6β-hydroxy-5α-pregnane and the reaction mixture is refluxed for 3 hours and then worked up as described in Example 1, part (a), to yield 6.1 grams of a solid crude product which on crystallization from acetone+hexane yields pure 3β:20β - diacetoxy - 5α - chloro - 6β:19 - oxido - 5α - pregnane melting at 148 to 150° C. Optical rotation $[\alpha]_D = +25°$ (in chloroform).

A solution of 4.0 grams of this compound in methanol is treated with 4.0 grams of potassium carbonate and water and refluxed for one hour, then evaporated in a water-jet vacuum and from the residue the crude 3β:20β-dihydroxy-5α-chloro-6β:19-oxido-5α-pregnane melting at 237 to 240° C. is isolated in the usual manner.

A mixture of 1.0 gram of the above compound, 50 cc. of pyridine and 2.2 grams of chromium trioxide is stirred for 20 hours at 60° C. and the reaction mixture is then worked up as described in Example 1, part (b). Recrystallization of the crystalline residue yields pure Δ⁴-3:20-dioxo-6β:19-oxido-pregnene (6β:19-oxido-progesterone) melting at 142 to 143° C. Optical rotation $[\alpha]_D = -18.8°$ (in chloroform).

(b) 1.0 gram of the 3β:20β-diacetoxy-5α-chloro-6β:19-oxido-5α-pregnane described in part (a) is oxidized in 30 cc. of glacial acetic acid with addition of a solution of 1.5 grams of chromium trioxide in 1.5 cc. of water for 20 minutes at 70° C. Working up as described in Example 2, part (d) furnishes a crude product which on recrystallization from methylene chloride+ether yields the pure 19;6β-lactone of 3β:20β-diacetoxy-5α-chloro-6β-hydroxy - 5α - pregnane-19-acid melting at 189 to 190° C.

In an analogous manner there is obtained from the 18:20-lactone of 3β-acetoxy-5α-chloro-6β:19-oxido-20β-hydroxy-5α-pregnane-18-acid described in Example 1, in addition to acid reaction products, the 18:20; 19:6β-dilactone of 3β-acetoxy-5α-chloro-6β:20β-dihydroxy-5α-pregnane-18:19-diacid.

Example 11

(a) A suspension of 110 grams of lead tetraacetate and 50 grams of dry calcium carbonate in 4.5 liters of cyclohexane is stirred for about 40 minutes at the boil. 25 grams of 3β-acetoxy-5α-chloro-6β-hydroxy-20-oxo-pregnane and 32 grams of iodine are then added and the solution is kept at the boil while being irradiated with a 1000 watt lamp and stirred until the color of iodine has completely disappeared (about 30 to 90 minutes). The whole is then cooled, the undissolved salts are filtered off and the filter residue is rinsed with cyclohexane. The filtrate is washed with dilute sodium thiosulfate solution and with water, dried and evaporated in a water-jet vacuum. Crystallization of the crude product from ether yields 19.2 grams of pure 3β-acetoxy-5α-chloro-6β:19-oxido-20-oxo-pregnane melting at 150 to 153° C. From the mother liquor another 3.3 grams of a slightly less pure substance can be isolated. Optical rotation of the pure compound $[\alpha]_D = +65°$ (in chloroform). Its infra-red spectrum contains bands, inter alia, at 5.78, 5.88, 6.70, 8.13, 9.12, 9.66, 10.60, 10.86 and 11.75μ.

In an analogous manner there are obtained

From 3β:17α-diacetoxy-5α-chloro-6β-hydroxy-20-oxo-pregnane the 3β:17α-diacetoxy-5α-chloro-6β:19-oxido-20-oxo-pregnane melting at 187 to 187.5° C.,
From 3β-acetoxy-5α-chloro-6β-hydroxy-17α-valerianyloxy-20-oxo-pregnane the 3β-acetoxy-5α-chloro-6β:19-oxido-17α-valerianyloxy-20-oxo-pregnane, and
From 3β-acetoxy-5α-chloro-6β-hydroxy-17α-methoxy-20-oxo-pregnane the 3β-acetoxy-5α-chloro-6β:19-oxido-17α-methoxy-20-oxo-pregnane.

The chlorohydrin used as starting material is prepared in the following manner: A solution of 150 grams of pregnenolone acetate in 5 liters of ether is treataed with 150 grams of chlorinated lime (containing 30% of active chlorine) and 8.2 liters of water and the reaction mixture is vigorously stirred. After 5 minutes 105 cc. of glacial acetic acid and after another 25 minutes 500 cc. of potassium iodide solution of 10% strength are added. Finally, the aqueous phase is separated, and the ethereal solution is washed with sodium thiosulfate solution of 10% strength, dilute sodium bicarbonate solution and with water, dried and evaporated in a water-jet vacuum. The residue is treated with 800 cc. of acetone and kept overnight at 0° C., to yield 47.5 grams, and from the mother liquor another 58 grams, of 3β-acetoxy-5α-chloro-6β-hydroxy-20-oxo-pregnane which melts at 196 to 197° C. after recrystallization from acetone. Optical rotation $[\alpha]_D = +25.5°$ (in chloroform). The infra-red spectrum of the compound displays bands, inter alia, at 2.75, 5.78, 5.88, 8.12, 8.68, 9.68 and 9.72μ.

In an analogous manner addition of hypochlorous acid on to the 17α-acetoxy-pregneneolone acetate yields 3β:17α-diacetoxy-5α-chloro-6β-hydroxy-20-oxo-pregnane.

(b) 10.0 grams of 3β-acetoxy-5α-chloro-6:19-oxido-20-oxo-pregnane in 180 cc. of acetic anhydride are treated with 4.0 grams of para-toluenesulfonic acid and heated in a bath maintained at 140 to 150° C. for 4 hours under a pressure of 50 to 60 mm. Hg, during which 90 cc. of solvent are distilled off. The reaction mixture is cooled, poured over ice and water and extracted with a 3:1-mixture of ether and methylene chloride. The extracts are washed with sodium bicarbonate solution and with water, dried and evaporated. The residue (10.40 grams) is dissolved in benzene and the solution is filtered through 100 grams of alumina. The eluates yield 10.1 grams of crude product which still contains about 15% of starting material. Crystallization from methylene chloride+ether+petroleum ether yields pure Δ¹⁷⁽²⁰⁾-3β:20-diacetoxy-5α-chloro-6β:19-oxido-pregnene melting at 171 to 172° C. Optical rotation $[a]_D = +18.4°$ (in chloroform). The infra-red spectrum of the compound contains bands, inter alia, at 5.76, 6.70, 7.30, 8.16, 9.13, 10.60 and 10.87μ.

A solution of 10.1 grams of crude Δ¹⁷⁽²⁰⁾-3β:20-diacetoxy-5α-chloro-6β:19-oxido-pregnene in 250 cc. of benzene is treated with 240 cc. of an ethereal solution of perbenzoic acid (containing 2 molecular equivalents of peracid calculated on the enol acetate) and kept for 5 hours at room temperature, after which time 70.2% of the amount of per-acid calculated for complete oxidation has been consumed. The reaction mixture is diluted with ice water, extracted with ether and the extracts are washed with water, sodium bicarbonate solution and water. The dried ethereal solution yields 9.90 grams of crude epoxide. After recrystallization from methylene chloride+ether pure 3β.20-diacetoxy-5α-chloro-6β:19; 17α:20-bisoxido-pregnane melts at 192 to 194° C. Optical rotation $[\alpha]_D = +14.4°$ (in chloroform). The iinfra-red spectrum of the compound contains bands, inter alia, at 5.76, 6.70, 7.30, 8.13, 8.58, 9.67, 10.66 and 10.81μ.

A mixture of 10.0 grams of crude 3β:20-diacetoxy-5α-chloro-6β:19; 17α:20-bisoxido-pregnane, 800 cc. of alcohol and 45 cc. of aqueous sodium hydroxide solution of 2.4% strength is kept for one hour at room temperature, treated with 500 cc. of water and concentrated in a water-jet vacuum to half the volume. The concentrate is heated for 3 hours at 60° C., and the precipitate is filtered off, thoroughly washed with water and the filter residue is dried, to yield 9.85 grams of crude product which after crystallization from methylene chloride + methanol yields 3.90 grams of pure 3β:17α-dihydroxy-5α-chloro-6β:19-oxido-20-oxo-pregnane melting at 251 to 253° C. Optical rotation $[\alpha]_D = +22.4°$ (in chloroform + alcohol). From the mother liquor another compound separates out which melts at 251 to 253° C.; it is probably a rearrangement product of the above diol.

A mixture of 200 mg. of 3β:17α-dihydroxy-5α-chloro-6β:19-oxido-20-oxo-pregnane, 1.0 cc. of acetic anhydride and 1.0 cc. of pyridine is stirred for 14 hours, with the starting material slowly passing into solution. The solution is then poured into ice water and extracted with a mixture of ether and methylene chloride. The extracts are washed with water, hydrochloric acid, sodium bicarbonate solution and with water and dried, to yield 210 mg. of crude product which is crystallized from ether + petroleum ether to yield 185 mg. of pure 3β-acetoxy-5α-chloro-6β:19-oxido-17α-hydroxy-20-oxo-pregnane melting at 166 to 167° C. Occasionally, the compound is obtained in a crystalline modification melting up to about 175° C. Optical rotation $[\alpha]_D = -2.1°$ (in chloroform). Its infra-red spectrum contains bands, inter alia, at 2.74, 2.82, 5.76, 5.85, 6.69, 7.30, 8.10, 9.65 and 10.86μ.

A mixture of 100 mg. of 3β:17α-dihydroxy-5α-chloro-6β:19-oxido-20-oxo-pregnane, 1.0 cc. of acetic anhydride and 100 mg. of para-toluene sulfonic acid is stirred for 2½ hours at 40° C., then poured into a mixture of 50 cc. of ice water and 0.5 cc. of pyridine, diluted with ether after 10 minutes, and the extracts are washed with sodium bicarbonate solution and with water. Recrystallization of the evaporation residue (106 mg.) from ether + petroleum ether yields 98 mg. of pure 3β:17α-diacetoxy-5α-chloro-6β:19-oxido-20-oxo-pregnane melting at 187 to 187.5° C. Optical rotation $[\alpha]_D = -6.2°$ (in chloroform). The infra-red spectrum of the compound contains bands, inter alia, at 5.77, 6.68, 7.79, 8.10, 9.65, 10.39 and 10.85μ.

The identical compound can also be prepared by acetylating 4.0 grams of 3β-acetoxy-5α-chloro-6β:19-oxido-17α-hydroxy-20-oxo-pregnane for 2½ hours at 40 to 50° C. in 40 cc. of acetic anhydride with addition of 4.0 grams of para-toluenesulfonic acid. The reaction mixture is cooled, poured into a mixture of 1 liter of ice water and 10 cc. of pyridine, the whole is stirred for 15 minutes and the precipitate is filtered off, washed with water, taken up in ether, and the solution is washed until it is neutral, dried and evaporated. The residue (3.85 grams) yields on crystallization from ether + petroleum ether 3.0 grams of 3β:17α-diacetoxy-5α-chloro-6β:19-oxido-20-oxo-pregnane melting at 187 to 187.5° C.

A mixture of 2.8 grams of the latter compound, 100 cc. of methanol and 500 mg. of potassium carbonate is stirred in 2.5 cc. of water for 13 hours at room temperature, then diluted with water, the methanol is distilled off in a water-jet vacuum, the residue is extracted with ether, and the extracts are washed with water, dried and evaporated. The residue (2.52 grams) yields on crystallization from methylene chloride + methanol 1.98 grams of 3β-hydroxy-5α-chloro-6β:19-oxido - 17α - acetoxy - 20 - oxo-pregnane melting at 238 to 241° C. After one crystallization the melting point rises to 243 to 245° C.

A solution of 425 mg. of this compound in 15 cc. of acetone is treated at −5 to −6° C. with 0.5 cc. of a solution, diluted with water to 50 cc., of 13.3 grams chromium trioxide in 11.5 cc. of concentrated sulfuric acid. The whole is stirred for 30 minutes at −5° C., and a solution of 5.5 grams of crystalline sodium acetate in 10 cc. of water and 35 cc. of benzene is added. The organic phase is separated, washed with semi-saturated sodium chloride solution, dried and evaporated in a water-jet vacuum, to yield 450 mg. of crude 3:20-dioxo-5α-chloro-6β-19-oxido-17α-acetoxy-pregnane. The pure compound, obtained by recrystallization from methylene chloride + petroleum ether, melts at 156 to 158° C. with decomposition, then solidifies again and melts finally at 185 to 190° C. The infra-red spectrum of the compound contains bands, inter alia, at 5.84, 6.75, 6.82, 7.35, 8.15, 8.30, 9.10, 9.32, 9.70, 10.35 and 11.00μ.

A solution of 350 mg. of 3:20-dioxo-5α-chloro-6β:19-oxido-17α-acetoxy-pregnane in 100 cc. of methanol is treated with a solution of 600 mg. of potassium acetate in 70 cc. of water and while stirring about half the solvent is first distilled off and the remainder is evaporated to dryness in a water-jet vacuum. The residue is then dissolved in 70 cc. of water and a mixture of ether + methylene chloride 3:1, the organic phase is washed with water, dried and evaporated, to yield 308 mg. of a crude product which on recrystallization from ether + petroleum ether yields in two portions a total of 275 mg. of pure Δ⁴-3:30-ioxo-6β:19-oxido - 17 - acetoxy-pregnene melting at 190 to 192° C. Optical rotation $[\alpha]_D = -109°$ (in chloroform). The infra-red spectrum of the compound contains bands, inter alia, at 5.75, 5.82, 5.98, 7.30, 8.07, 8.35, 9.07, 9.75, 10.35, 10.55, 11.37 and 12.30μ.

(c) 10 grams of 3β:20-diacetoxy-5α-chloro-6β:19; 17α:20-bisoxido-pregnane (prepared as described in part (b)) are treated with 100 cc. of a 2:1-mixture of glacial acetic acid and water and the whole is heated for one hour on a boiling water bath, then cooled, treated with 250 cc. of water and the acetic acid is distilled off under reduced pressure. The residue is taken up in a mixture of methylene chloride and ether, and the solution is washed with water, dried and evaporated. The resulting residue is dissolved with heating in methanol and then left to itself, whereupon 4.2 grams of crystalline 3β-acetoxy-5α-chloro-6β:19-oxido - 17α - hydroxy-20-oxo-pregnane are obtained. The pure product, obtained by chromatography on silica gel and crystallization from methylene chloride + methanol, belts at 175 to 176° C.

(d) 2.5 grams of 3β:17α-diacetoxy-5α-chloro-6β:19-oxido-20-oxo-pregnane are dissolved in 50 cc. of glacial acetic acid. The solution is heated to 70° C., and a solution of 3.75 grams of chromium trioxide in 3.75 cc. of water and 30 cc. of glacial acetic acid is added in the course of about 4 minutes, and the whole is stirred for 30 minutes at 70° C. The reaction mixture is cooled, poured on to water and the precipitated white crystals filtered off with suction. There are obtained 2.48 grams of the crude 19:6β-lactone of 3β:17α-diacetoxy-5α-chloro-6β-hydroxy-20-oxo-pregnane-19-acid melting at 215–219° C. The pure compound recrystallized from a mixture of methylene chloride and ether melts at 235–237° C. Infra-red bands inter alia at 5.64μ (γ-lactone); 5.80μ (acetate + 20 ketone); 8.08μ; 9.05μ; 9.16μ; 9.25μ; 9.60μ; 10.34μ; 10.78μ and 12.07μ.

1.7 grams of the 19:6β-lactone of 3β:17α-diacetoxy-5α-chloro-6β-hydroxy-20-oxo-pregnane-19-acid are stirred in 104 cc. of methanol for 45 minutes in a bath heated to 70° C. after adding 340 mg. of sodium bicarbonate and 3.1 cc. of water. The reaction mixture is cooled, 500 cc. of water are added and extraction is carried out with ether. The extracts are washed with water and dried to yield 1.57 grams of crude 19:6β-lactone of 3β:6β-dihydroxy-5α-chloro - 17α-acetoxy-20 - oxo-pregnane-19-acid which after being recrystallized from a mixture of methylene chloride and ether, melts at 246–248° C.

*Example 12*

As described in Examples 1, part (a), 2, part (a), and 8, part (a), the cyclic 3α:5α-carbonate obtained from 3α:5α:6β-trihydroxy-20-oxo-pregnane by a known method by reaction with phosgene in toluene is converted into the corresponding oxido compound, namely the cyclic 3α:5α-carbonate of 3α:5α-dihydroxy-6β:19-oxido-20-oxo-pregnane.

Example 13

5.0 grams of the 18:20-lactone of 3β-acetoxy-5α-chloro-6β:20-dihydroxy-5α-pregnane-18-acid are reacted in 1.5 liters of cyclohexane with lead tetraacetate and iodine as described in Example 8, part (a). When the crude product obtained as described in that example is crystallized from benzene, it yields the pure 18:20-lactone of 3β-acetoxy-5α-chloro - 6β:19-oxido-20β - hydroxy-5α-pregnane-18-acid melting at 229 to 234° C. Optical rotation [α]$_D$=—48.3° (in chloroform).

When the latter product is hydrolyzed with potassium carbonate in methanol it yields the 18:20-lactone of 3β:20β-dihydroxy - 5α-chloro-6β:19-oxido - 5α-pregnane-18-acid which is directly oxidized with chromic acid+sulfuric acid in acetone at 0° C. to the crude 18:20-lactone of 3-oxo-5α-chloro-6β:19-oxido - 20β-hydroxy-5α-pregnane-18-acid. From the latter product hydrochloric acid is eliminated by boiling for one hour in pyridine, whereupon there is obtained the 18:20-lactone of Δ$^4$-3-oxo-6β:19-oxido-20β-hydroxy-pregnene-18-acid which, after having been recrystallized from methylene chloride+ether, melts at 259 to 260° C. Optical rotation [α]$_D$=—111° (in chloroform).

The 5α-chloro-6β-hydroxy compound used as starting material is obtained as described in Example 1, part (a), by adding hypochlorous acid on to the 18:20-lactone of Δ$^5$-3β-acetoxy-20β-hydroxy-pregnene-18-acid; this compound is prepared by treating Δ$^5$-3β-acetoxy-20β-hydroxy-pregnene with lead tetraacetate and iodine in boiling cyclohexane and subsequent oxidation with chromium trioxide and pyridine with addition of silver chromate at 60° C. After having been recrystallized from methylene chloride+ether the pure 18:20-lactone of 3β-acetoxy-5α-chloro - 6β-hydroxy - 20β-hydroxy - 5α-pregnane-18-acid melts at 227 to 228° C. Optical rotation [α]$_D$=—48.3° (in chloroform).

Example 14

3 grams of 3β-acetoxy-5α-chloro-6β-hydroxy-16:17α-oxido-20-oxo-5α-pregnane are reacted as described in Example 8, part (a), with lead tetraacetate and iodine in cyclohexane, to yield 3.5 grams of a crude product which on recrystallization from methylene chloride+ether yields 3β-acetoxy - 5α-chloro-6β:19; 16:17α-bisoxido - 20-oxo-pregnane melting at 230 to 233° C. Optical rotation [α]$_D$=+36.3° (in chloroform).

By hydrolyzing with potassium carbonate in methanol to yield the 3β-hydroxy-5α-chloro-6β:19;16:17α-bisoxido-20-oxo-5α-pregnane, followed by oxidation of the crude product (melting at 241 to 247° C.) with chromium trioxide in pyridine as described in Example 10, part (a), there is obtained Δ$^4$-3:20-dioxo-6β:19;16:17α-bisoxido-pregnene (6β:19;16:17α-bisoxido-progesterone) melting at 154 to 156° C.

The 5α-chloro compound used as starting material is prepared by adding hypochlorous acid on to the known Δ$^5$-3β-acetoxy-16:17α-oxido-20-oxo-pregnene as described in Example 1, part (a). After recrystallization from acetone+hexane the resulting pure 3β-acetoxy-5α-chloro-6β-hydroxy-16:17α-oxido-20-oxo-5α-pregnane melts at 194 to 198° C. Optical rotation [α]$_D$=—7.8° (in chloroform).

Example 15

5.0 grams of mercuric acetate and 2.5 grams of 3β-acetoxy-5α-chloro-6β-hydroxy - 17 - oxo-androstane are suspended in 100 cc. of carbon tetrachloride. After adding 3.85 grams of iodine, the mixture is boiled under reflux for one hour while being irradiated with a 500 watt lamp, and after the color of the iodine has disappeared (after about 10 to 15 minutes) another 1.9 grams of iodine are added. During the reaction much red mercuric iodide precipitates. The cooled solution is filtered, the residue washed with carbon tetrachloride and the filtrate washed with potassium iodide solution and thiosulfate solution, dried and evaporated. From the residue (2.63 grams) there are obtained by crystallization from a mixture of ether and hexane 2.16 grams of pure 3β-acetoxy-5α-chloro-6β:19-oxido-17-oxo-androstane melting at 180–182° C.

Example 16

When a suspension of 5.0 grams of mercuric acetate and 2.5 grams of 3β-acetoxy-5α-chloro-6β-hydroxy-17-oxo-androstane in 100 cc. of carbon tetrachloride is heated to the boil for 16 hours in the dark after the addition of 3.98 grams of iodine and the violet solution is then worked up as described in Example 15, there are obtained 2.72 grams of a crystalline crude product which in the infrared spectrum shows in the CO area a distinct band at 5.60μ in addition to the bands of the 17-ketone and the 3-acetate at 5.80μ and which consists chiefly of 3β-acetoxy-5α-chloro-6β:19-oxido-17-oxo-androstane. The crude product contains in addition a small quantity of 6β:19-lactone of 3β-acetoxy-5α-chloro-6β-hydroxy-17-oxo-androstane-19-acid.

Example 17

40 grams of 3β-acetoxy-5α-chloro-6β-hydroxy-17-oxo-androstane and 70 grams of lead tetraacetate (containing 7 grams of glacial acetic acid) are added to a solution of 5.0 grams of iodine in 400 cc. of carbon tetrachloride, and the mixture is heated at the boil with stirring. In the course of the reaction the color of the iodine disappears almost completely. The mixture is then cooled to room temperature, the lead salts are filtered off and the reddish filtrate is washed in turn with aqueous sodium thiosulfate solution, dilute sodium carbonate solution and water. Finally, the colorless carbon tetrachloride is filtered off from a little precipitated lead iodide and the filtrate is evaporated to dryness.

The crystalline residue (about 40 grams) is boiled for a short time in 80 cc. of methanol and after being allowed to stand for a while at 0–5° C. filtered with suction.

There are obtained 32 to 34 grams of pure white 3β-acetoxy-5α-chloro-6:19-oxido-17-oxo-androstane melting at 180–182° C. (sintering from 170° C.).

Example 18

2.5 grams of 3β:17β-diacetoxy-6β-hydroxy-androstane, 5 grams of mercuric acetate and 3.9 grams of iodine are covered with 100 cc. of carbon tetrachloride. The suspension is boiled under reflux in the dark for 2 hours with stirring, the solution is filtered and the insoluble portion washed with carbon tetrachloride. The carbon tetrachloride solution is washed with a solution of 1 gram of potassium iodide and 10 grams of sodium thiosulfate in 50 cc. of water, then with water, dried and evaporated under reduced pressure. The residue is dissolved in 40 cc. of glacial acetic acid and the solution shaken for 20 minutes at a temperature below 20° C. with 20 grams of zinc powder in small portions. The zinc is then filtered with suction and washed with acetone. The concentrated solution is treated with ethyl acetate, the ethyl acetate solution washed with water, dilute hydrochloric acid and water, dried and evaporated under reduced pressure. The residue is chromatographed on 75 grams of aluminum oxide (II). From the residue of the evaporated benzene eluates there are obtained on recrystallization from a mixture of isopropylether and pentane 1.219 grams of 3β-17β-diacetoxy-6β:19-oxido-androstane melting at 144–146° C.

From the residue of the evaporated ether eulates there are obtained on recrystallization from a mixture of methylene chloride and isopropylether 250 mg. of 3β:17α-diacetoxy-6-oxo-androstane melting at 178–179° C.

Example 19

2.5 grams of 3β:17β-diacetoxy-6β-hydroxy-androstane, 5.0 grams of silver acetate and 4.4 grams of iodine are covered with 200 cc. of cyclohexane. The suspension is irradiated with a 250 watt combined mercury vapour and incandescent lamp (made by the firm Philips) and simultaneously boiled under reflux for 2 hours. The suspension is filtered with suction, the insoluble salts washed with cyclohexane, the solution agitated with a solution of 1 gram of potassium iodide and 10 grams of sodium thiosulfate in 50 cc. of water, then with water, dried and evaporated under reduced pressure. The residue is treated with zinc and glacial acetic acid and the reaction product obtained as described in Example 18. On recrystallization from a mixture of isopropylether and pentane there are obtained 1.38 grams of 3β:17β-diacetoxy-6β:19-oxido-androstane melting at 143–145° C.

The mother liquors are chromatographed on 40 grams of aluminum oxide (II). From the residue of the benzene eluates there are obtained on recrystallization (as described above) 580 mg. of 6β:19-ether melting at 144–146° C.

From the ether eluates there may be obtained as described in Example 18 100 mg. of 3β:17β-diacetoxy-6-oxo-androstane melting at 178–179° C.

*Example 20*

15 grams of lead tetraacetate and 5 grams of calcium carbonate are boiled under reflux with 500 cc. of cyclohexane for 10 minutes with stirring. 2.5 grams of 3β:17β-diacetoxy-6β-hydroxy-androstane and 4 grams of iodine are added, and the reaction mixture boiled under reflux for another 2½ hours. The suspension is then filtered with suction. The insoluble portions are then washed with ether and the organic solution worked up as described in Example 19. After treatment with zinc and glacial acetic acid there are obtained 1.87 grams of crystalline 3β:17β-diacetoxy-6β:19-oxido-androstane melting at 143–145° C. After chromatographic separation of the mother liquors there are obtained 240 mg. of the same 6β:19-ether melting at 144–146° C.

*Example 21*

2.5 grams of 3β:17β-diacetoxy-6β-hydroxyandrostane, 3 grams of calcium carbonate, 5 grams of N-iodo-succinimide and 2.85 grams of iodine are covered with 200 cc. of cyclohexane. The suspension is boiled under reflux for 1½ hours with stirring, another 5 grams of N-iodo-succinimide are added, and boiling under reflux is continued for 1½ hours. The suspension is worked up as described in Example 19 and purified. After chromatographic separation there are obtained 1.53 grams of 3β:17β-diacetoxy-6β:19-oxidoandrostane melting at 144–146° C.

*Example 22*

A suspension of 17.5 grams of lead tetraacetate and 8.0 grams of calcium carbonate in 800 cc. of cyclohexane is first heated for 30 minutes to boiling point while stirring. 4.0 grams of 3β:11α:20β-triacetoxy-5α-chloro-6β-hydroxypregnane and 5.13 grams of iodine are then added and the mixture is heated for another hour to boiling point while being stirred and exposed to a 500 watt lamp, the color of the iodine slowly disappearing. After the reaction time has expired, the mixture is cooled, the insoluble salts are separated by filtration and the filtrate is washed with 10% sodium thiosulfate solution and with water. The aqueous solutions are extracted once more with ether and the combined organic solutions are dried and evaporated in a water-jet vacuum. The partly crystallizing crude product obtained (6.146 grams) is dissolved in 100 cc. of glacial acetic acid to reduce the starting material contained therein and the solution is stirred for 2 hours at 80° C. after adding 10 grams of zinc dust. The undissolved zinc is then filtered off and the filtrate is diluted with methylene chloride and washed with sodium bicarbonate solution and with water. 4.253 grams of crude product are obtained from the dried organic solutions after evaporation. By crystallization from ether, 923 mg. of 3β:11α:20β-triacetoxy-5α-chloro-6β:10-oxidopregnane having a melting point of 228–230° C. can be separated therefrom (conversion from 185° C.);

$$[\alpha]_D = -6.2°$$

(in chloroform); IR bands inter alia at 5.77μ and 8.09μ (acetates), 9.63μ; 9.75μ and 10.84μ.

The mother liquor is evaporated to dryness and chromatographed on 100 grams of aluminum oxide. With 900 cc. of hexane, 900 cc. of hexane-benzene mixture (4:1) only 81 mg. of oily by-products are eluted. From the fractions eluted with another 300 cc. of benzene-hexane mixture (2:1) there are obtained by crystallization from aqueous methanol 119 mg. of Δ⁵-3β:11α:20β-triacetoxy-pregnene, which has been produced by zinc reduction of the 5α-chloro-6β-hydroxy compound. The following 300 cc. of benzene-hexane mixture (2:1) and 300 cc. of benzene contain mixtures of substances, while the evaporation residues of the fractions eluted with 900 cc. of benzene and 600 cc. of benzene-ethyl acetate mixture (9:1), when crystallized from ether, yield a further 411 mg. of the above-described 3β:11α:20β-triacetoxy-5α-chloro-6β:19-oxido-pregnanes. Finally from the fractions eluted with benzene-ethyl acetate mixture (1:1), with ethyl acetate and with methanol, 718 mg. of 3β:11α:20β-triacetoxy-5α-chloro-6β:19-oxido-19-hydroxypregnane having a melting point of 232–233° C. are obtained by crystallization from methylene chloride-ether; $[\alpha]_D^{25} = -13.2°$ (in chloroform-alcohol in a ratio 1:1). IR bands inter alia at 2.79μ and 2.93μ (OH), 5.78μ and 8.12μ (acetates); 9.30μ; 9.70μ, 10.55μ and 10.91μ.

The 3β:11α:20β-triacetoxy-5α-chloro-6β-hydroxypregnane employed as starting material is prepared as follows: 18.71 grams of Δ⁴-3-oxo-11α-acetoxy-20β-hydroxypregnene are heated to boiling point in 100 cc. of isopropenyl acetate after adding 0.1 cc. of concentrated sulfuric acid. After one hour, 10 cc. of solvent are distilled off, boiling is then continued for another hour under reflux and the solution is then evaporated in a water-jet vacuum after adding 500 mg. of anhydrous sodium acetate. The residue is taken up in methylene chloride and the solution is washed with water, dried and once more evaporated. From the crude product (21 grams), 13.66 grams of pure Δ³·⁵-3:11α:20β-triacetoxy-pregnatriene having a melting point of 145–150° C. are obtained by crystallization from ether; $[\alpha]_D^{25} = -144.3°$ (in chloroform); UV maximum at 235 mμ (ε=19,500); IR bands inter alia at 5.77μ (with shoulder at 5.68μ) and 8.16μ (acetates), 9.76μ; 10.40μ and 10.83μ.

12.0 grams of this enol acetate are dissolved in 900 cc. of alcohol. A solution of 6.0 grams of sodium borohydride in 120 cc. of 70% aqueous alcohol is added to the solution, which has been cooled to +5° C., and the reaction mixture is allowed to stand for 3 days at 0° C. 10 cc. of glacial acetic acid are then dropped in while stirring and the reaction mixture is concentrated in a water-jet vacuum to about 100 cc., diluted with methylene chloride and washed with water. 11.52 grams of a residue are obtained from the dried methylene chloride solution after evaporation and from this 9.78 grams of pure Δ⁵-3β-hydroxy-11α:20β-diacetoxypregnene can be isolated by crystallization from ether. The compound, after being dissolved once more in methanol and allowed to crystallize, melts at 162–165° C. $[\alpha]_D^{25} = -69.6°$ (in chloroform); IR bands inter alia at 2.74μ (OH), 5.78μ and 8.09μ (acetates); 9.76μ and 10.45μ.

9.78 grams of this compound are allowed to stand overnight at room temperature in 50 cc. of pyridine and 30 cc. of acetic anhydride. The reaction mixture is then evaporated to dryness in a water-jet vacuum and the residue is crystallized from aqueous methanol. 10.1 grams of Δ⁵-3β:11α:20β-triacetoxypregnene having a melting point of 141–143° C. are obtained; $[\alpha]_D^{25} = -59.4°$ (in chloroform). IR bands inter alia at 5.78μ and 8.09μ (acetates), 9.76μ; 10.44μ and 10.93μ.

3.0 grams of Δ⁵-3β:11α:20β-triacetoxypregnene are dissolved in 180 cc. of ether. After adding 180 cc. of water and 3.0 grams of chlorinated lime, the reaction solution is thoroughly stirred and 2.1 cc. of glacial acetic acid are then added. The two phases are then well mixed for 40 minutes with a vibromixer, 50 cc. of 2% sodium thiosulfate solution and 50 cc. of 5% potassium iodide solution are then added, separation is carried out and the organic solution is washed several times with water. 1.78 grams of 3β:11α:20β - triacetoxy-5α-chloro-6β-hydroxypregnane having a melting point of 225–227° C. are obtained from the evaporation residue (3.417 grams) by crystallization from ether; $[α]_D^{25}=-43.2°$ (in chloroform); IR bands inter alia at 2.74μ (OH); 5.78μ and 8.09μ (acetates); 9.30μ; 9.56μ; 9.75μ and 10.45μ.

*Example 23*

A solution, cooled to 0° C., of 100 mg. of 3β:11α:20β-triacetoxy - 5α-chloro-6β:19-oxido-19-hyrdoxypregnane in 10 cc. of acetone is stirred for 10 minutes at 0° C. after adding 0.2 cc. of a 26.6% solution of chromium trioxide in sulfuric acid of 42% strength. 500 mg. of crystalline sodium acetate are then added and the solution is diluted with methylene chloride and washed several times with water. 95 mg. of crystallized lactone of 3β:11α:20β-triacetoxy - 5α-chloro-6β-hydroxypregnene-19-acid, having a melting point of 246–247° C., are obtained from the dried methylene chloride solution; $[α]_D^{25}=-50.1°$ (in chloroform); IR bands inter alia at 5.58μ (lactone), 5.75μ and 8.09μ (acetates); 9.26μ; 9.65μ and 10.77μ.

*Example 24*

250 mg. of 3β:11α:20β - triacetoxy-5α-chloro-6β:19-oxidopregnane are dissolved in 50 cc. of methanol and the solution is boiled under reflux for 10 hours after adding 500 mg. of potassium carbonate and 12.5 cc. of water. 1.0 cc. of glacial acetic acid is then added, the mixture is evaporated to about 15 cc. in a water-jet vacuum and diluted with methylene chloride and water, separation is carried out and washing to neutrality with dilute sodium bicarbonate solution, and the organic solution is dried and evaporated. 160 mg. of crystallized 3β:11α:20β-trihydroxy-5α-chloro-6β:19 oxidopregnane, which is precipitated from methanol-ether in methanol-containing crystals having a melting point of 264–266° C., are obtained; $[α]_D^{25}=-25.9°$ (in chloroform)). IR bands inter alia at 3.03μ (OH); 9.15μ; 9.63μ; 9.80μ and another 10 bands between 10.24μ and 12.60μ (in Nujol).

295 mg. of crude 3β:11α:20β-trihydroxy-5α-chloro-6β:19-oxidopregnane are dissolved in 100 cc. of acetone and stirred at 0° C. for 15 minutes after adding 1.0 cc. of a 26.6% solution of chromium trioxide in sulfuric acid of 42% strength. 3.0 cc. of isopropanol are then added, stirring is continued for another 5 minutes at 0° C., a solution of 2.0 grams of crystalline sodium acetate in 10 cc. of water is added and the reaction mixture is concentrated to about 30 cc. in a water-jet vacuum and diluted with methylene chloride and the organic solution is washed with water, dried and evaporated (residue: 288 mg.). The 3:11:20 - trioxo-5α-chloro-6β:19-oxidopregnane obtained in this way melts, after being dissolved in methylene chloride-ether and allowed to crystallize, within a few degrees between 130 and 170° C. with decomposition, according to the rate of heating; $[α]_D^{25}=+167°$ (in chloroform); IR bands inter alia at 5.84μ (with shoulder at 5.80μ); 6.68μ; 7.38μ; 8.55μ; 9.12μ; 9.68μ and 10.56μ.

200 mg. of crude 3:11:20-trioxo-5α-chloro-6β:19-oxidopregnane are suspended in 30 cc. of methanol and the mixture is stirred for 30 minutes at 60° C. after adding 400 mg. of crystalline sodium acetate and 1.5 cc. of water. The solution is then concentrated and diluted with methylene chloride and the extract is washed with water, dried and evaporated. 180 mg. of crystallized Δ⁴-3:11:20-trioxo-6β:19-oxido-17-iso-pregnene, which melts at 265–268° C. after dissolution in methylene chloride-ether and crystallization, are obtained. $[α]_D^{25}=-13.4°$ (in chloroform); UV maximum at 236mμ (ε=11,800); IR bands inter alia at 5.84μ (11- and 20-ketone); 5.95μ (3-ketone), 6.72μ; 8.33μ; 8.61μ; 9.75μ and 11.41μ.

*Example 25*

500 mg. of 3β:11α:20β-triacetoxy-5α-chloro-6β:19-oxidopregnane are dissolved in 100 cc. of methanol and allowed to stand for 18 hours at 25° C. after adding a solution of 1.0 gram of potassium carbonate in 25 cc. of water. 2 cc. of glacial acetic acid are then added, the reaction mixture is concentrated to about 20 cc. in a water-jet vacuum and diluted with methylene chloride and the organic solution is washed with water, sodium bicarbonate solution and water. From the residue of the dried methylene chloride solution there are obtained by crystallization from aqueous methanol 110 mg. of 3β-hydroxy - 5α - chloro-6β:19-oxido-11α:20β-diacetoxypregnane in hydrous crystals which lose water of crystallization at 114–116° C. and melt at 168–170° C.; $[α]_D^{25}=-20.2°$ (in chloroform); IR bands inter alia at 2.78μ (OH); 5.77μ and 8.11μ (acetates); 9.52μ; 9.78μ and 10.93μ.

The mother liquor which, in addition to further amounts of the above compound, also contains 3β:20β-dihydroxy-5α-chloro-6β:19-oxido-11α-acetoxypregnane, is evaporated to dryness and the residue (340 mg.) is dissolved in 30 cc. of acetone. 1.0 cc. of a 26.6% solution of chromium trioxide in sulfuric acid of 42% strength is added to the solution, which has been cooled to 0° C., and stirring is carried out for 15 minutes at 0° C. 3.0 cc. of isopropanol are then added, dilution with methylene chloride is carried out after another 5 minutes and the solution is washed several times with water. The dried methylene chloride solution is evaporated to dryness and the residue (312 mg.), which contains 3-oxo-5α-chloro-6β:19-oxido-11α:20β-diacetoxypregnane and 3:20-dioxo-5α-chloro-6β:19-oxido-11α-acetoxypregnane, is dissolved in 30 cc. of methanol and heated for one hour to 60° C. after adding a solution of 500 mg. of crystalline sodium acetate in 6 cc. of water. The mixture is then concentrated in a water-jet vacuum, diluted with methylene chloride and washed several times with water. 286 mg. of crude product are obtained from the dried methylene chloride solution after evaporation. By repeated crystallization from ether-methylene chloride, 26 mg. of pure Δ⁴ - 3 - oxo-6β:19-oxido-11α:20β-diacetoxypregnene having a melting point of 274–280° C. can be isolated therefrom. UV maximum at 235 mμ (ε=12,600); IR bands inter alia at 5.78μ and 8.11μ (acetates); 5.96μ (3-ketone); 6.74μ; 9.26μ; 9.75μ; 10.43μ and 11.40μ.

The mother liquor is evaporated to dryness and the residue, dissolved in benzene, is chromatographed on 10 grams of aluminum oxide. From the fraction eluted with benzene Δ⁴-3:20-dioxo-6β:19-oxido-11α-acetoxypregnene having a melting point of 187–189° C. can be isolated by crystallization from ether-methylene chloride; $[α]_D^{25}=+86.6°$ (in chloroform); UV maximum at 237 mμ (ε=11,500); 5.95μ (3-ketone); 6.27μ; 7.27μ; 8.09μ; 9.28μ; 9.75μ; 10.35μ; 10.62; 10.85μ; and 11.40μ.

Further amounts of the above-described 11α:20β-diacetate are precipitated from the mother liquor of the same fraction on standing for a long time.

*Example 26*

A suspension of 8.75 grams of lead tetraacetate and 4.0 grams of calcium carbonate in 200 cc. of carbon tetrachloride is heated for 10 minutes to boiling point. 2.0 grams of 3β:11α:20β - triacetoxy-5α-chloro-6β-hydroxypregnane and 2.57 grams of iodine are then added and the boiling reaction mixture is stirred, while exposed to a 500 watt lamp, until the iodine color has disappeared (about 30 minutes). The cooled mixture is filtered and the filtrate is washed with sodium thiosulfate solution and water, dried and evaporated. The residue (2.60 grams)

is dissolved in benzene and filtered through a column containing 60 grams of aluminum oxide. From the residues of the fractions eluted with 1000 cc. of benzene, 7.17 mg. of 3β:11α:20β-triacetoxy-5α-chloro-6β:19-oxidopregnane having a melting point of 228–230° C. are obtained by crystallization from ether. From the fractions eluted with 600 cc. of benzene-ethyl acetate mixture (1:1) and with 200 cc. of ethyl acetate 339 mg. of 3β:11α:20β - triacetoxy - 5α - chloro-6β:19-oxido-19-hydroxypregnane having a melting point of 232–233° C. are obtained after crystallization from ether.

In similar manner, there is obtained from 3β:11α:17β-triacetoxy - 5α - chloro-6β-hydroxy17α-methylandrostane (prepared from Δ⁴-3-oxo-11α:17β-dihydroxy-17α-methylandrostene by enol acetylation to Δ³˒⁵-3:11α:17β-triacetoxy-17α-methylandrostadiene, sodium borohydride reduction and reacetylation and addition of hypochlorous acid, as described in Example 22) a mixture of 3β:11α: 17β - triacetoxy-5α-chloro-6β:19-oxido-17α-methylandrostane and 3β:11α:17β-triacetoxy-5α-chloro-6β:19-oxido-19-hydroxy-17α-methylandrostane, which can be separated by chromatography on aluminum oxide.

*Example 27*

A solution of 1.48 grams of crude 3β:11α:20β-trihydroxy-5α-chloro-6β:19-oxidopregnane in 430 cc. of acetone is cooled to 5° C., mixed with 4.3 cc. of a 26.6% solution of chromium trioxide in sulfuric acid of 42% strength, and the whole is stirred for 1 hour at 0 to 5° C. 13 cc. of isopropanol are then dropped in and then a solution of 4.3 grams of potassium acetate in 45 cc. of water, the whole is concentrated in a water-jet vacuum to about 35 cc. and repeatedly extracted with methylene chloride. The extracts are washed with water and dried, to yield 1.352 grams of crude 3:11:20-trioxo-5α-chloro-6β:19-oxidopregnane which is dissolved in 50 cc. of pyridine, and the solution is heated for 1 hour at 100° C., then concentrated in a water-jet vacuum to about 10 cc. and extracted with methylene chloride. The extracts are washed with N-hydrochloric acid and with water, dried and evaporated. The residue (1.351 grams) yields on crystallization from methylene chloride+ether 795 mg. of Δ⁴-3:11:20-trioxo-6β:19-oxidopregnene melting at 190–191° C. Optical rotation [α]$_D$ =+134° (in chloroform). Ultra-violet maximum at 236 mμ (ε=11,-750). Infra-red bands inter alia at 5.83, 5.94, 6.70, 7.33, 8.30, 8.62, 9.68, 9.78 and 11.40μ.

*Example 28*

A suspension of 3.25 grams of dry lead tetraacetate and 1.5 grams of dry calcium carbonate in 150 cc. of cyclohexane is heated to the boil, then mixed with 740 mg. of 3β:11α:20β-triacetoxy-6β-hydroxy-5α-pregnane and 950 mg. of iodine, and the solution is irradiated with a 500 watt lamp and stirred at the boil until the color of iodine has disappeared. The reaction mixture is then cooled, undissolved salts are filtered off, and the filtrate is washed with sodium thiosulfate solution and with water. The solution is dried and evaporated in a water-jet vacuum, to yield 1.06 grams of an oily residue which is dissolved in hexane and poured over a column of 25 grams of alumina, 140 cc. of hexane and 70 cc. of benzene elute 230 mg. of a high-boiling oil (mainly cyclohexanol acetate). The following fractions eluted with 210 cc. of benzene contain, inter alia, 3β:11α:19:20β-tetraacetoxy-6β:19-oxido-5α-pregnane. Another 70 cc. of benzene and 70 cc. of a 1:1-mixture of benzene and ethyl acetate elute 435 mg. of 3β:11α:20β-triacetoxy-6β:19-oxido-5α-pregnane which, after recrystallization from methylene chloride+ether, melts at 219–221° C. Optical rotation [α]$_D$=−24° (in chloroform). Infra-red bands inter alia at 5.77, 6.69, 8.12, 9.30, 9.55 and 9.75μ.

Further elution with 70 cc. of a 1:1-mixture of benzene and ethyl acetate furnishes 27 mg. of a non-crystallizing mixture of substances; with another 140 cc. of the above solvent mixture and with 140 cc. of ethyl acetate there are obtained 81 mg. of 3β:11α:20β-triacetoxy-6β:19-oxido-19-hydroxy-5α-pregnane. On crystallization from acetone+hexane the latter compound is obtained in the form of felted needles containing solvent, melting at 168–172° C. with decomposition. Optical rotation

[α]$_D$=−21°

(in chloroform). Infra-red bands inter alia at 2.77, 2.91, 5.77, 7.30, 8.12, 9.30 and 9.77μ.

49 mg. of 3β:11α:20β-triacetoxy-6β:19-oxido-19-hydroxy-5α-pregnane are dissolved in 10 cc. of acetone, mixed with 0.2 cc. of a 26.6% solution of chromium trioxide in sulfuric acid of 42% strength; the mixture is stirred for 10 minutes at 0° C., mixed with 500 mg. of crystalline sodium acetate and water, repeatedly extracted with methylene chloride, and the extracts are washed with water. The methylene chloride extracts furnish 51 mg. of the crude crystalline 6β:19-lactone of 3β:11α:20β-triacetoxy-6β-hydroxy-5α-pregnane-19-acid which, after recrystallization from methylene chloride+ether, melts at 284–285° C. Infra-red bands inter alia at 5.62, 5.76, 7.29, 8.12, 9.10, 9.10, 9.32, 9.69 and 10.92μ.

50 mg. of crude 3β:11α:19:20β-tetraacetoxy-6β:19-oxido-5α-pregnane are heated in a mixture of 5 cc. of glacial acetic acid and 2.5 cc. of water for 30 minutes at 100° C. The solution is then evaporated to dryness in a water-jet vacuum, and the residue is oxidized with chromium trioxide+sulfuric acid in acetone as described above, to yield 50 mg. of crude product from which, by crystallization from methylene chloride+ether, the pure 6:19-lactone of 3β:11α:20β-triacetoxy-6β-hydroxy-5α-pregnane-19-acid melting at 284–285° C. can be isolated.

184 mg. of 3β:11α:20β - triacetoxy - 6β:19 - oxido-5α-pregnane in 40 cc. of methanol and 4 cc. of water are mixed with 400 mg. of potassium carbonate, and the whole is refluxed for 10 hours, then cooled, 0.8 cc. of glacial acetic acid is added, the whole is evaporated, diluted with water and extracted 6 times with a 4:1-mixture of methylene chloride and methanol. The extracts are washed with saturated sodium chloride solution, dried and evaporated. The resulting crude 3β:11α:20β-trihydroxy-6β:19-oxido-5α-pregnane (135 mg.) is dissolved in 10 cc. of acetone, cooled to 0° C. and oxidized with 0.5 cc. of Kiliani solution for 15 minutes at 0° C. The batch is then mixed with 2.0 cc. of isopropanol, diluted with methylene chloride, repeatedly washed with water, and the organic solution is dried and evaporated, to yield 110 mg. of crude product which is dissolved in benzene and filtered through 3 grams of alumina, 19:1- and 4:1-mixtures of benzene and ethyl acetate elute 75 mg. of 3:11:20-trioxo-6β:19-oxido-5α-pregnane which melts at 230–232° C. after recrystallization from methylene chloride+ether. Optical rotation [α]$_D$=+182° (in chloroform). Infra-red bands inter alia at 5.78, 7.35, 8.29, 8.63, 9.64 and 9.86μ.

The 6β-hydroxy compound used as starting material in this example can be prepared as follows:

5.0 grams of the Δ⁵-3β:11α:20β-triacetoxypregnane described in Example 22 are dissolved in 75 cc. of glacial acetic acid. At an internal temperature of 10 to 25° C. 30 cc. of fuming nitric acid are dropped in and then, in the course of one hour at the same temperature, 3.0 grams of sodium nitrite are added in portions. The batch is then poured into 450 cc. of water and the separated product is extracted with methylene chloride. The extracts are washed, dried and evaporated in a water-jet vacuum. Yield: 5.68 grams of crude Δ⁵-3β:11α:20β-triacetoxy-6-nitropregnene. A specimen recrystallized from ether melts at 188–192° C. Optical rotation [α]$_D$=−75° (in chloroform). Ultra-violet maximum at 260 mμ

(ε=1850)

Infra-red bands inter alia at 5.76, 6.55, 7.28, 8.09 and 9.75μ.

5.6 grams of the crude nitro compound are dissolved in 60 cc. of glacial acetic acid, mixed with 6 cc. of water and then portionwise with 10 grams of zinc dust while being stirred. The whole is then stirred and refluxed for 4 hours and allowed to cool. The reaction mixture is filtered, rinsed with glacial acetic acid, and the filtrate is evaporated in a water-jet vacuum. The residue is taken up in methylene chloride, the extracts are washed with water and then with sodium bicarbonate solution and with water, the organic solution is dried and finally evaporated. Crystallization of the residue from aqueous methanol yields 1.41 grams of $3\beta:11\alpha:20\beta$-triacetoxy-6-oxo-5$\alpha$-pregnane melting at 189–191° C. Optical rotation $$[\alpha]_D = -46°$$

(in chloroform). Infra-red bands inter alia at 5.77, 7.27, 8.09, 9.27, 9.75, 10.41 and 10.89$\mu$.

On chromatography on alumina the mother liquor furnishes another 800 mg. of the identical compound.

1.0 gram of $3\beta:11\alpha:20\beta$-triacetoxy-6-oxo-5$\alpha$-pregnane in 100 cc. of glacial acetic acid is mixed with 400 mg. of platinum oxide and hydrogenated at 36 to 40° C. After about 19 hours the amount of hydrogen calculated for one molecular equivalent has been absorbed. The catalyst is filtered off and the filtrate evaporated in a water-jet vacuum. From a mixture of hexane and ether there are obtained 900 mg. of $3\beta:11\alpha:20\beta$-triacetoxy-6$\beta$-hydroxy-5$\alpha$-pregnane which, after having been recrystallized once more, melts at 178–180° C. Optical rotation $$[\alpha]_D = -36°$$

(in chloroform). Infra-red bands inter alia at 2.75, 5.78, 7.25, 8.09, 9.27, 9.55, 9.76 and 10.50$\mu$.

*Example 29*

A suspension of 1.5 grams of lead tetraacetate and 750 mg. of calcium carbonate in 75 cc. of cyclohexane is boiled and stirred for 15 minutes, then mixed with 300 mg. of $3\beta:20\beta$-diacetoxy-11-oxo-6$\beta$-hydroxy-5$\alpha$-pregnane and 450 mg. of iodine and the whole is irradiated with a 500 watt lamp and boiled until the solution loses its color, and then cooled. The mixture is filtered and the precipitate is rinsed with cyclohexane. The filtrate is washed with thiosulfate solution, dried and evaporated in a water-jet vacuum. The residue (366 mg.) is dissolved in a 1:1-mixture of benzene and hexane and chromatographed on 10 grams of alumina. Benzene and a 19:1-mixture of benzene and ethyl acetate elute 165 mg. of crude $3\beta:20\beta$-diacetoxy-6$\beta$:19-oxido-11-oxo-5$\alpha$-pregnane. After having been recrystallized from ether+pentane, the pure compound melts at 169–172° C. Infra-red bands inter alia at 5.80, 5.85, 6.70, 7.33, 8.13, 9.32 and 9.68$\mu$.

The fractions eluted with benzene+ethyl ester 9:1 (19 mg.) yield on crystallization from methylene chloride +ether the 6:19-lactone of $3\beta:20\beta$-diacetoxy-6$\beta$-hydroxy-11-oxo-5$\alpha$-pregnane-19-acid melting at 273–276° C. Optical rotation $[\alpha]_D = +33°$ (in chloroform). Infra-red bands inter alia at 5.62, 5.78, 6.22, 7.31, 8.11, 9.30 and 9.67$\mu$.

The fractions eluted with 4:1 and 1:1 benzene+ethyl acetate contain $3\beta:20\beta$-diacetoxy-6$\beta$:19-oxido-11-oxo-19-hydroxy-5$\alpha$-pregnane and a by-product separable by crystallization from ether. The residue from the mother liquor of this compound (69 mg.), is dissolved in 10 cc. of acetone and oxidized with 0.2 cc. of chromic acid +sulfuric acid solution (Kiliani solution) for 10 minutes at 0° C. 500 mg. of sodium acetate are then added and the whole is diluted with water and extracted with methylene chloride. The extracts are washed with water and dried and the residue (67 mg.) yields after crystallization 17.8 mg. of the 6:19-lactone of $3\beta:20$-diacetoxy-6$\beta$-hydroxy-11-oxo-5$\alpha$-pregnane-19-acid melting at 273–276° C.

In identical manner $3\beta:20\beta$-diacetoxy-5$\alpha$-chloro-6$\beta$-hydroxy-11-oxopregnane yields the corresponding compounds substituted by a chlorine atom in 5$\alpha$-position.

The $3\beta:20\beta$-diacetoxy-6$\beta$-hydroxy-11-oxo-5$\alpha$-pregnane used as starting material in this example can be prepared as follows:

9.24 grams of 11-ketoprogesterone in 100 cc. of isopropenyl acetate are mixed with 0.1 cc. of concentrated sulfuric acid and the whole is refluxed for 1 hour, whereupon 20 cc. of solvent are distilled off and the remainder is again boiled for 1 hour. The cooled solution is mixed with 5.0 grams of sodium acetate and evaporated to dryness in a water-jet vacuum. The residue is taken up in methylene chloride and water, and the organic solution is washed with water and evaporated, to yield 12.54 grams of crude $\Delta^{3:5:20}$-3:20-diacetoxy-11-oxopregnatriene which is dissolved in 500 cc. of alcohol and 0.5 cc. of pyridine. The solution is cooled to 5° C., mixed with a solution of 10.0 grams of sodium borohydride in 250 cc. of aqueous alcohol of 70% strength and kept overnight at 0 to 5° C. 50 cc. of sodium hydroxide solution of 5% strength are then added, the mixture is heated for 2 hours at 70° C., then cooled, and the excess reducing agent is decomposed by dropping in 30 cc. of glacial acetic acid. The mixture is concentrated in a water-jet vacuum to about 200 cc. and repeatedly extracted with methylene chloride. The extracts are washed with sodium chloride solution, dried and evaporated. To reduce the 11-oxo group the crude product (8.45 grams) is dissolved in 60 cc. of tetrahydrofuran and the solution is stirred dropwise into a suspension of 2.5 grams of lithium aluminum hydride in 300 cc. of tetrahydrofuran. The whole is stirred for 30 minutes at room temperature, and then heated for 30 minutes at the boil. The reaction mixture is cooled and then mixed slowly, with stirring, dropwise with a mixture of 15 cc. of ethyl acetate and 30 cc. of tetrahydrofuran, and then 100 cc. of saturated sodium sulfate solution. 30 grams of anhydrous sodium sulfate are then added, the batch is filtered and the precipitate is thoroughly rinsed with tetrahydrofuran. The filtrate is evaporated in a water-jet vacuum. On crystallization from aqueous acetone the residue (7.30 grams) yields 4.36 grams of $\Delta^5$-$3\beta:11\beta:20\beta$-trihydroxypregnene melting at 198–203° C. Optical rotation $[\alpha]_D = -49.5°$ (in chloroform). Infra-red bands (in Nujol) inter alia at 2.98, 9.26, 9.48, 9.62, 10.37 and 11.23$\mu$.

A mixture of 3.25 grams of this triol, 30 cc. of pyridine and 30 cc. of acetic anhydride is kept overnight at room temperature, and then evaporated to dryness in a water-jet vacuum. The residue is dissolved in benzene and filtered through 70 grams of alumina. 1.2 liters of benzene elute 2.7 grams of $\Delta^5$-$3\beta:20\beta$-diacetoxy-11$\beta$-hydroxypregnene which, after crystallization from hexane, melts at 123–127° C. Optical rotation $[\alpha]_D = -23.5°$ (in chloroform). Infra-red bands inter alia at 2.75, 5.78, 7.28, 8.10, 9.22, 9.35, 9.66 and 10.43$\mu$.

A solution of 3.0 grams of crude $\Delta^5$-$3\beta:20\beta$-diacetoxy-11$\beta$-hydroxypregnene in 150 cc. of acetone is oxidized for 10 minutes at 0° C. with 6.0 cc. of Kiliani solution, then mixed with 30 cc. of isopropanol, stirred for another 5 minutes at 0° C., diluted with water and methylene chloride, separated, and the organic solution is washed with water. The dried solution is evaporated, to yield 2.78 grams of $\Delta^5$-$3\beta:20\beta$-diacetoxy-11-oxopregnene which, after recrystallization from ether+pentane, melts at 134–139° C. Optical rotation $[\alpha]_D = -1°$ (in chloroform). Infra-red bands inter alia at 5.79, 5.87, 7.28, 8.12, 9.38, 9.64, 9.52 and 10.46$\mu$.

2.88 grams of crude $\Delta^5$-$3\beta:20\beta$-diacetoxy-11-oxo-pregnene are dissolved in 45 cc. of glacial acetic acid and 18 cc. of fuming nitric acid are stirred in at 10 to 15° C. In the course of 1 hour 18 grams of sodium nitrite are then added portionwise, the whole is slowly diluted with water and repeatedly extracted with methylene chloride. The extracts are washed with water, dried and evaporated. The resulting crude 6-nitro compound is dissolved in a mixture of 18 cc. of glacial acetic acid and 3.6 cc. of water, mixed with 6.0 grams of zinc dust, and boiled for 4 hours with stirring, then filtered. The filtrate is evaporated in a water-jet vacuum, the residue is taken up in methylene chloride, and the solution is washed with sodium bicarbonate solution and with water. The methylene chloride solution is dried and yields 2.85 grams of a residue which is crystallized from ether to yield 8.72 mg. of 3β:20β-diacetoxy-6:11-dioxo-5α-pregnane melting at 191–192° C. Optical rotation [α]$_D$=+12° (in chloroform). Infra-red bands inter alia at 5.76, 5.81, 7.30, 8.10, 9.29 and 9.69μ.

By chromatography of the residue from the mother liquor on alumina, another 670 mg. of the identical substance are obtained.

A mixture of 500 mg. of 3β:20β-diacetoxy-6:11-dioxo-5α-pregnane in 50 cc. of glacial acetic acid and 150 mg. of platinum oxide is hydrogenated until the amount of hydrogen corresponding to one molecular equivalent has been taken up. The catalyst is then filtered off and the filtrate is evaporated in a water-jet vacuum. When the residue is crystallized from ether+pentane, it yields 462 mg. of 3β:20β-diacetoxy-6β-hydroxy-11-oxo-5α-pregnane melting at 142–144° C. Optical rotation [α]$_D$=+8.8° (in chloroform). Infra-red bands inter alia at 2.77, 5.78, 5.84, 7.32, 8.10, 9.29 and 9.72μ.

*Example 30*

A suspension of 2.5 grams of lead tetraacetate and 1.25 grams of calcium carbonate in 125 cc. of cyclohexane is stirred for 15 minutes at the boil, then mixed with 500 mg. of 3β:11β:20β-triacetoxy-6β-hydroxy - 5α - pregnane and 750 mg. of iodine, and boiled further while being irradiated with a 500 watt lamp until the color of the solution has disappeared. The batch is cooled, the undissolved salts are filtered off, and the filtrate is washed with sodium thiosulfate solution and with water, dried, and evaporated in a water-jet vacuum, to yield 612 mg. of a residue which crystallizes with ether. On recrystallization from methylene chloride+ether it yields 320 mg. of 3β:11β:20β-triacetoxy-6β:19-oxido - 5α - pregnane melting at 192–195/198–200° C. Optical rotation [α]$_D$=+47.6° (in chloroform). Infra-red bands inter alia at 5.76, 6.18, 7.30, 8.13, 9.27, 9.73 and 11.72μ.

The mother liquor contains a small amount of 3β:11β:19:20β-tetraacetoxy-6β:19-oxido - 5α - pregnane. When the residue from the mother liquor is treated for 30 minutes at 100° C. with 7.5 cc. of aqueous acetic acid of 75% strength, then evaporated to dryness and the residue is oxidized in 10 cc. of acetone at 0° C. with 0.2 cc. of Kiliani solution, and the batch is worked up in usual manner, there is obtained a crude product in which the lactone band of the 6:19-lactone of 3β:11β:20β-triacetoxy-6β-hydroxy-5α-pregnane-19-acid is clearly evident at 5.68μ.

A solution of 1.44 grams of 3β:11β:20β-triacetoxy-6β:19-oxido-5α-pregnane in 50 cc. of absolute tetrahydrofuran is stirred into a suspension of 3.0 grams of lithium aluminum hydride in 200 cc. of tetrahydrofuran. The solution is refluxed for 30 minutes, then cooled, mixed with about 10 cc. of saturated sodium sulfate solution, the precipitate is filtered off, and the filtrate is evaporated in a water-jet vacuum, to yield 970 mg. of crude 3β:11β:20β-trihydroxy-6β:19-oxido-5α-pregnane. 48 mg. of this compound are dissolved in 3.5 cc. of acetone and oxidized for 15 minutes at 0° C. with 0.17 cc. of Kiliani solution; 0.67 cc. of isopropanol is then added, the whole is diluted with methylene chloride, and the solution is washed with water. The evaporation residue from the extracts gives on crystallization from methylene chloride+ether 25 mg. of 3:11:20-trioxo-6β:19-oxido-5α-pregnane melting at 230 to 232° C.

970 mg. of crude 3β:11β:20β-trihydroxy-6β:19-oxido-5α-pregnane are kept overnight at room temperature in a mixture of 15 cc. of pyridine and 5.0 cc. of acetic anhydride. While cooling with ice, 5 cc. of methanol are added, the mixture is stirred for 30 minutes at room temperature and finally evaporated in a water-jet vacuum. The residue is dissolved in methylene chloride, and the solution is washed until neutral, dried and evaporated. Crystallization of the residue from methylene chloride +ether yields 983 mg. of 3β:20β-diacetoxy-6β:19-oxido-11β-hydroxy-5α-pregnane melting at 199–200° C. Optical rotation [α]$_D$=+40° (in chloroform). Infra-red bands inter alia at 2.76, 5.77, 7.30, 8.10, 9.30 and 9.70μ.

90 mg. of the above compound are oxidized for 15 minutes at 0° C. in 4.5 cc. of acetone with 0.18 cc. of Kiliani solution, then mixed with 0.9 cc. of isopropanol, diluted with methylene chloride, and the solution is washed with water. The methylene chloride solution is dried and evaporated, to yield a crystalline residue (100 mg.) which, crystallized from ether, furnishes pure 3β:20-diacetoxy-6β:19-oxido-11-oxo-5α-pregnane melting at 169–172° C. Optical rotation [α]$_D$=+56° (in chloroform).

The 3β:11β:20β - triacetoxy-6β-hydroxy - 5α - pregnane used as starting material in this example can be prepared as follows:

A solution of 1.153 grams of crude Δ$^5$-3β:20β-diacetoxy-11β-hydroxypregnene in 11 cc. of glacial acetic acid and 2.2 cc. of acetic anhydride is mixed with 110 mg. of para-toluenesulfonic acid and kept overnight at room temperature. The reaction mixture is then poured into 100 cc. of water, repeatedly extracted with ether, and the extracts are washed with water, dried and evaporated. Yield: 1.136 grams of crude Δ$^5$-3β:11β:20β-triacetoxy-5α-pregnene. From hexane the compound separates out in the form of a gel and, after having been dried, it melts at about 112–113° C. Optical rotation [α]$_D$=−3.8° (in chloroform). Infra-red bands inter alia at 5.79, 7.28, 8.11, 9.23, 9.78 and 10.48μ.

36 cc. of fuming nitric acid are stirred dropwise into an ice-cooled solution of 5.47 grams of crude Δ$^5$-3β:11β:20β-triacetoxypregnene in 90 cc. of glacial acetic acid. While stirring at room temperature, there are then added portionwise within one hour 3.6 grams of sodium nitrite, the whole is slowly diluted with water and extracted with methylene chloride. The extracts are washed with water, dried and evaporated. The resulting crude 6-nitro compound (6.69 grams) is dissolved in a mixture of 36 cc. of glacial acetic acid and 7.2 cc. of water, mixed with 12 grams of zinc dust, and the whole is stirred and heated for 4 hours at the boil, then filtered, the filter residue is rinsed with glacial acetic acid, and the filtrate is evaporated to dryness in a water-jet vacuum. The residue is taken up in methylene chloride, washed with sodium bicarbonate solution and with water, and the organic solution is dried and evaporated. The crystalline residue is dissolved in benzene and filtered through 30 grams of alumina, elution being carried out with 500 cc. of benzene. When these benzene eluates are evaporated and the residue is crystallized from ether+hexane, there are obtained 2.74 grams of pure 3β:11β:20β-triacetoxy-6-oxo-5α-pregnane melting at 220–222° C. Optical rotation [α]$_D$=+20.3° (in chloroform). Infra-red bands inter alia at 5.78, 7.28, 8.11, 8.45, 9.26, 9.74 and 10.37μ.

2.74 grams of 3β:11β:20β-triacetoxy-6-oxo-5α-pregnane in 100 cc. of glacial acetic acid are hydrogenated with 500 mg. of platinum oxide until hydrogen is no longer being absorbed. The catalyst is then filtered off, the filtrate is evaporated to dryness in a water-jet vacuum, and the residue crystallized from ether+pentane, to yield 2.264 grams of pure 3β:11β:20β - triacetoxy - 6β - hydroxy-5α-pregnane melting at 192–193° C. Optical rotation [α]$_D$=+24° (in chloroform). Infra-red bands inter alia at 2.74, 5.77, 7.27, 8.10, 9.28, 9.73 and 10.50μ.

*Example 31*

1.15 grams of iodine are added to a suspension of 750 mg. of 3β:11α:20β - triacetoxy-6β-hydroxy-5α-pregnane and 1.5 grams of silver acetate in 150 cc. of cyclohexane, and the mixture stirred while being irradiated with a 250 watt Philips combined mercury vapour and incandescent lamp, and boiled under reflux. After 20 minutes the iodine color has disappeared. 200 mg. of iodine are then added and the whole boiled for 2 hours. The reaction mixture is cooled, the separated silver iodide filtered off, washed with cyclohexane and the filtrate extracted in succession with sodium thiosulfate solution and with water. The dried organic solution is evaporated in a water-jet vacuum and the residue chromatographed on 20 grams of aluminum oxide. From the fractions (679 mg.) eluted with benzene and a mixture of benzene and ethyl acetate (9:1) there are obtained by crystallization from ether+pentane 571 mg. of pure 3β:11α:20β-triacetoxy-6β:19-oxido-5α-pregnane melting at 219–221° C.

Example 32

A suspension of 1.5 grams of N-iodo-succinimide, 100 mg. of iodine, 1.0 gram of calcium carbonate and 750 mg. of 3β:11α:20β-triacetoxy-6β-hydroxy-5α-pregnane in 150 cc. of cyclohexane is boiled under reflux with stirring while being irradiated with a 250 watt Philips combined mercury vapour and incandescent lamp. After an interval of 1 hour and a further interval of 2 hours there is added 1.0 gram of N-iodo-succinimide on each occasion. After a total of 3 hours the reaction mixture is cooled, the insoluble constituents are separated off by filtration and the filtrate worked up as described in Example 31. There are obtained 836 mg. of crude product from which 552 mg. of 3β:11α:20β-triacetoxy-6β:19-oxido-5α-pregnane melting at 219–221° C. can be isolated by crystallization from ether+pentane.

Example 33

A suspension of 3.0 grams of mercuric acetate, 750 mg. of 3β:11α:20β-triacetoxy-6β-hydroxy-5α-pregnane and 3.3 grams of iodine in 150 cc. of cyclohexane is boiled with stirring while being irradiated with a 250 watt Philips combined mercury vapour and incandescent lamp. After about 45 minutes the iodine color has disappeared and ample red mercuric iodide separated off. At the end of the reaction the mixture is cooled, the salts filtered off and the filtrate washed with sodium thiosulfate solution and with water. From the dried organic solution there are obtained by evaporation in a water-jet vacuum 981 mg. of residue which is crystallized from ether+pentane to yield 533 mg. of pure 3β:11α:20β-triacetoxy-6β:19-oxido-5α-pregnane.

Example 34

402 grams of crude 3β:17α-diacetoxy-5α-chloro-6β hydroxy-20-oxo-pregnane, 710 grams of lead tetraacetate, 51 grams of iodine and 2.05 grams of α:α′-azoisobutyric acid nitrile are heated at the boil in 4.6 liters of carbon tetrachloride for 15 minutes on a water bath and boiled under reflux for about 15 minutes. The unhomogeneous reaction mixture is poured on to 1.7 liters of methylene chloride, suction-filtered and the residue washed out with 850 cc. of methylene chloride. The filtrate is washed with 5 liters of sodium thiosulfate solution of 20% strength, 0.5 liter of sodium carbonate solution of 20% strength and finally with water. The carbon tetrachloride-methylene chloride solution is treated with sodium sulfate and solid sodium thiosulfate and stirred for 2 hours, then filtered and evaporated in vacuo. The residue is stirred with 500 cc. of ether, suction-filtered and washed out with ether to yield 286 grams of 3β:17α-diacetoxy-5α-chloro-6β:19-oxido-20-oxo-pregnane melting at 207–210° C. From the mother liquor there are obtained by concentration another 41 grams of the same product. By recrystallization from a mixture of methylene chloride, ether and petroleum ether the same compound can also be obtained in another crystalline form melting at 187–188° C.

The chlorhydrin used as starting material for the above-described reaction may be obtained in the following manner:

1600 grams of crude Δ⁵-3β:17α-diacetoxy-20-oxo-pregnene, obtained by acetylation of 1 kilogram of Δ⁵-3β-acetoxy-17α-hydroxy-20-oxo-pregnene, are suspended in a mixture of 8 liters of acetone, 800 cc. of water and 85 cc. of 2 N-hydrochloric acid. 283 cc. of tertiary butyl hypochlorite are added dropwise in the course of 15 minutes with cooling (13–19° C.). Towards the end of the addition the reaction mixture becomes paler. The mixture is then stirred for 5 minutes and a solution of 85 mg. of crystalline sodium acetate in 8.5 liters of water added. The precipitated reaction product is suction-filtered, stirred with 4 liters of a mixture of acetone and water (1:1) for 30 minutes at 0° C., suction filtered and dried for 24 hours at 25° C. and 24 hours at 50° C. in vacuo to yield 805 grams of 3β:17α-diacetoxy-5α-chloro-6α-hydroxy-20-oxo-pregnane melting at 204–207° C. On recrystallizing this substance once from a mixture of methylene chloride and hexane a product is obtained melting at 208–210° C. Optical rotation: $[\alpha]_D^{25} = -35°$.

In the same manner 3β-acetoxy-5α-chloro-6β:19-oxido-17α-capronyloxy-20-oxo-pregnane melting at 192–194° C. is obtained from Δ⁵-3β-acetoxy-17α-capronyloxy-20-oxo-pregnene (M.P. 103–104° C.), obtained by esterifying Δ⁵-3β-acetoxy-17α-hydroxy-20-oxo-pregnene with caproic acid anhydride in pyridine, via 3β-acetoxy-5α-chloro-6β-hydroxy-17α-capronyloxy-20-oxo-pregnane (M.P. 165–166° C.). By partial hydrolysis 3β-hydroxy-5α-chloro-6β:19-oxido-17α-capronyloxy-20-oxo-pregnane melting at 168–169° C. is obtained, and from the latter by oxidation 3:20 - dioxo - 5α-chloro - 6β:19 - oxido - 17α-capronyloxy-pregnane melting at 128° C. with decomposition, and then by splitting off hydrochloric acid by meansn of potassium acetate in methanol+water Δ⁴-3:20-dioxo-6β:19-oxido-17α-capronyloxy-pregnene melting at 133–134° C. is obtained.

Example 35

400 grams of iodine and 2.50 grams of 3β:20β-diacetoxy-6β-hydroxy-6α-methyl-5α-pregnane are added to a suspension, heated at 80° C. for a short while, of 6.0 grams of previously dried calcium carbonate and 15.0 grams of lead tetraacetate in 500 cc. of cyclohexane. The reaction mixture is stirred and boiled under reflux while being irradiated with a 500 watt lamp for 50 minutes. The cooled reaction mixture is filtered off from the insoluble constituents, the residue washed with cyclohexane and the combined filtrates washed with 150 cc. of sodium thiosulfate solution of 10% strength and twice with 150 cc. of water each time, the organic layer dried with sodium sulfate and the solvent evaporated in vacuo. The crude product is recrystallized from a mixture of ether and petroleum ether to yield 1.85 grams of pure 3β:20α-diacetoxy-6β:19-oxido-6α-methyl-5α-pregnane melting at 171–172° C. Optical rotation: $[\alpha]_D^{25} = +16°$ (c.=0.941). From the mother liquors there are obtained a further 159 mg. of the same product by chromatography and crystallization.

The 6β-hydroxy compound used as starting material is obtained by nitrating Δ⁵-3β:20β-diacetoxy-pregnene to form Δ⁵-3β:20β-diacetoxy-6-nitro-pregnene melting at 155–157° C., optical rotation $[\alpha]_D^{25} = -78°$ (c.=0.992), reduction with zinc and acetic acid to 3β:20β-diacetoxy-6-oxo-5α-pregnane melting at 172–173° C., optical rotation: $[\alpha]_D^{25} = -12°$ (c.=1.066); reaction with methyl magnesium bromide and then acetylation to form 3β:20β - diacetoxy - 6α - methyl - 6β - hydroxy - 5α - pregnane melting at 194° C.; optical rotation: $[\alpha]_D^{25} = +10°$ (c.=0.725).

Example 36

1.02 grams of 3β:20β-diacetoxy-6β:19-oxido-6α-methyl-5α-pregnane are dissolved in 15.0 cc. of methanol and after the addition of 1.00 gram of potassium hydroxide in 5 cc. of water, the whole is boiled under reflux for 1 hour. The solvent is evaporated to a great extent in vacuo and the reaction product precipitated by the addition of 50 cc. of water. The residue is then filtered, washed with water until the runnings are neutral and dried in vacuo to yield 750 mg. of 3β:20β-dihydroxy-6β:19-oxido-6α-methyl - 5α - pregnane. After recrystallization from a mixture of methylene chloride and ether, 730 mg. of the pure compound melting at 218–219° C. are obtained.

*Example 37*

6.50 cc. of a 4 N-solution of chromium trioxide in sulfuric acid are added dropwise to a solution of 650 mg. of 3β:20β-dihydroxy-6β:19-oxido-6α-methyl-5α-pregnane in 65 cc. of acetone at 0° C. with stirring. After 45 minutes at 0–5° C. the solution is poured on to 300 cc. of ice-water, stirred for 10 minutes, the precipitated product suction-filtered, washed with water, taken up in a mixture of ether and methylene chloride (4:1), the solution washed in succession with ice-cold sodium bicarbonate solution and water, dried and evaporated. By recrystallization of the resulting crude product from a mixture of methylene chloride, ether and petroleum ether there are obtained 477 mg. of pure 3:20-dioxo-6β:19-oxido-6α-methyl-5α-pregnane melting at 207–208° C.

*Example 38*

300 mg. of 3:20-dioxo-6β:19-oxido-6α-methyl-5α-pregnane are dissolved in 3.00 cc. of acetic anhydride, treated with 300 mg. of para-toluenesulfonic acid and allowed to stand for 18 hours at 25° C. The blue-colored solution is poured on to 50 cc. of ice-water and stirred for 2 hours for the purpose of decomposing the excess anhydride. The reaction mixture is then taken up in ether and the ethereal solution washed with ice-cold sodium bicarbonate solution and water until the runnings are neutral, dried and evaporated. The resulting amorphous crude product (340 mg.) is dissolved in 25 cc. of methanol and, after the addition of 450 mg. of sodium bicarbonate in 5 cc. of water, boiled under reflux for 1 hour and worked up in the conventional manner. There are obtained 260 mg. of an amorphous crude product from which, by chromatography on aluminum oxide (activity II), there are obtained 76 mg. of Δ⁴-3:20-dioxo-6α-methyl-19-hydroxy-pregnene melting at 165° C. The latter can be converted by oxidation into the corresponding pregnene-19-acid and by subsequent decarboxylation into the progestationally active Δ⁴-3:20-dioxo-6α-methyl-19-nor-pregnene.

What is claimed is:

1. Process for the manufacture of 6β:19-oxido-steroids selected from the group consisting of those of the androstane, pregnane, cholane, cholestane, spirostane, stigmastane and cardanolide series, wherein a 19-unsubstituted 6β-hydroxy-steroid is reacted with a compound containing monovalent positive iodine.

2. Process according to claim 1, wherein the 6β-hydroxy-steroid is treated with a member selected from the group consisting of an N-iodo-carboxylic acid amide and an N-iodo-carboxylic acid imide.

3. Process according to claim 1, wherein the 6β-hydroxy-steroid is treated with an acyl-hypoiodite, said acyl-hypoiodite being derived from a member selected from the group consisting of a lower aliphatic carboxylic acid and benzoic acid.

4. Process according to claim 1, wherein the 6β-hydroxy-steroid is treated with a silver acylate and iodine.

5. Process according to claim 1, wherein the 6β-hydroxy-steroid is treated with a mercuric diacylate and iodine.

6. Process according to claim 1, wherein the 6β-hydroxy-steroid is treated with a lead tetraacylate and iodine.

7. Process according to claim 1, wherein the reaction is carried out in a solvent selected from the group consisting of an alicyclic hydrocarbon and a halogenated aliphatic hydrocarbon.

8. Process according to claim 1, wherein the reaction is carried out between 50 and 150° C.

9. Process according to claim 1, wherein the reaction medium is irradiated with light of the wave length between 1,800 and 7,000 A.

10. Process according to claim 1, wherein there is used as starting material a member selected from the group consisting of a 19-unsubstituted 6β-hydroxy-androstane and a 19-unsubstituted 6β-hydroxy-pregnane.

References Cited by the Examiner

UNITED STATES PATENTS 3,013,026  12/61  Georgian et al. _____ 260—397.3
3,033,862   5/62  Ringold et al. _____ 260—239.55

LEWIS GOTTS, *Primary Examiner.*